(12) United States Patent
Zou et al.

(10) Patent No.: US 9,632,743 B2
(45) Date of Patent: Apr. 25, 2017

(54) DISPLAY COMPONENT AND ELECTRONIC DEVICE

(71) Applicant: Lenovo (Beijing) Co., Ltd., Beijing (CN)

(72) Inventors: Chenggang Zou, Beijing (CN); Xiaopan Zheng, Beijing (CN); Ke Shang, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/755,979

(22) Filed: Jun. 30, 2015

(65) Prior Publication Data

US 2016/0291913 A1  Oct. 6, 2016

(30) Foreign Application Priority Data

Mar. 31, 2015  (CN) .......................... 2015 1 0148366

(51) Int. Cl.

| | |
|---|---|
| *H04N 9/31* | (2006.01) |
| *G06F 3/147* | (2006.01) |
| *G02B 27/28* | (2006.01) |
| *G02B 27/14* | (2006.01) |
| *G02F 1/1335* | (2006.01) |
| *G06F 3/14* | (2006.01) |
| *G09G 3/20* | (2006.01) |

(52) U.S. Cl.
CPC ........... *G06F 3/147* (2013.01); *G02B 27/144* (2013.01); *G02B 27/283* (2013.01); *G02F 1/13362* (2013.01); *G06F 3/1423* (2013.01); *G09G 3/20* (2013.01); *G09G 2300/0426* (2013.01); *G09G 2310/0278* (2013.01)

(58) Field of Classification Search
USPC ........................ 348/790–792, 46; 353/20, 31
See application file for complete search history.

(56) References Cited

U.S. PATENT DOCUMENTS

| | | | | |
|---|---|---|---|---|
| 5,826,959 A | * | 10/1998 | Atsuchi .............. | G02B 27/1026 348/E9.027 |
| 6,120,153 A | * | 9/2000 | Ohta .................... | H04N 9/3105 348/E9.027 |
| 6,523,962 B2 | * | 2/2003 | Yajima ................ | G02B 27/283 348/E5.141 |
| 7,273,279 B2 | * | 9/2007 | Kobayashi .......... | H04N 9/3105 348/745 |
| 8,047,653 B2 | * | 11/2011 | Akahane .............. | B82Y 30/00 353/121 |
| 2008/0079903 A1 | * | 4/2008 | DiZio ................... | G02B 5/305 353/20 |

(Continued)

*Primary Examiner* — Paulos M Natnael
(74) *Attorney, Agent, or Firm* — Brinks Gilson & Lione; G. Peter Nichols

(57) ABSTRACT

A display component and an electronic device using the display component are described. The display component includes a light source unit configured to emit source light; at least two beam splitting units configured to receive the source light and generate at least two reflected lights, wherein directions of the at least two reflected lights match with each other; a display unit configured to receive the at least two reflected lights and adjust the at least two reflected lights to become initial light by adding information of an image to be displayed into the at least two reflected light.

18 Claims, 30 Drawing Sheets

(56) References Cited

U.S. PATENT DOCUMENTS

| | | | | |
|---|---|---|---|---|
| 2009/0179827 A1* | 7/2009 | Oakley | ............. | G03B 21/16 345/55 |
| 2009/0180079 A1* | 7/2009 | Oakley | ............. | G03B 21/26 353/31 |
| 2009/0180082 A1* | 7/2009 | Oakley | ............. | G03B 21/26 353/94 |
| 2009/0207379 A1* | 8/2009 | Oakley | ............ | G02B 27/283 353/20 |
| 2009/0207411 A1* | 8/2009 | Oakley | ............. | G03B 21/20 356/400 |
| 2010/0149073 A1* | 6/2010 | Chaum | ........... | G02B 27/0093 345/8 |
| 2010/0328433 A1* | 12/2010 | Li | ................. | G02B 27/26 348/46 |
| 2013/0063486 A1* | 3/2013 | Braun | ............ | G09G 3/002 345/633 |
| 2014/0125864 A1* | 5/2014 | Rihn | .............. | H04N 5/2256 348/367 |
| 2014/0177023 A1* | 6/2014 | Gao | ............... | H04N 5/2258 359/238 |

* cited by examiner

DISPLAY COMPONENT AND ELECTRONIC DEVICE

This application claims priority to Chinese Patent Application No. 201510148366.8 filed on Mar. 31, 2015; the entire contents of which are incorporated herein by reference.

The present application relates to the field of display component, and more particularly, to a display component and an electronic device using the display component.

BACKGROUND

In a display component that uses a light source unit to provide backlight, polarized light is required to illuminate so as to execute display. Natural light emitted from the light source unit is non-polarized light, cannot be directly used to illuminate a liquid crystal layer, natural light must be converted into polarized light. It has already been designed that a beam splitting unit (PBS) converts natural light into polarized light, converted S-polarized light is used to illuminate the liquid crystal layer. However, P-polarized light converted by the beam splitting unit cannot be used, which leads a waste of 50% of light intensity.

Accordingly, it is desired to provide a display component and an electronic device using the display component, which can improve an overall energy utilization of the display component.

SUMMARY

According to an embodiment of the present application, there is provided a display component, comprising: a light source unit configured to emit source light; at least two beam splitting units configured to receive the source light and generate at least two reflected lights, wherein directions of the at least two reflected lights match with each other; a display unit configured to receive the at least two reflected lights and adjust the at least two reflected lights to become initial light by adding information of an image to be displayed into the at least two reflected light.

According to another embodiment of the present application, there is provided a display component, comprising: a light source unit configured to emit source light; a first polarization unit configured to at least partially convert the source light into first reflected light, which is polarized light in a first polarized state; a display unit configured to receive the first reflected light and adjust the first reflected light to become initial light by adding information of an image to be displayed into the first reflected light, wherein a thickness of the first polarization unit in an exit direction of the initial light is less than a width of the display unit in an incident direction of the source light.

According to yet another embodiment of the present application, there is provided an electronic device, comprising: a processing component configured to generate a first image to be displayed and execute display control; a display component configured to execute display of the first image and including: a light source unit configured to emit source light; at least two beam splitting units configured to receive the source light and generate at least two reflected lights, wherein directions of the at least two reflected lights match with each other; a display unit configured to receive the at least two reflected lights and adjust the at least two reflected lights to become initial light by adding information of an image to be displayed into the at least two reflected light.

According to again yet another embodiment of the present application, there is provided an electronic device, comprising: a processing component configured to generate a first image to be displayed and execute display control; a display component configured to execute display of the first image and including: a light source unit configured to emit source light; a first polarization unit configured to at least partially convert the source light into first reflected light, which is polarized light in a first polarized state; a display unit configured to receive the first reflected light and adjust the first reflected light to become initial light by adding information of an image to be displayed into the first reflected light, wherein a thickness of the first polarization unit in an exit direction of the initial light is less than a width of the display unit in an incident direction of the source light.

The display component and the electronic device using the display component according to an embodiment of the present application can improve an overall energy utilization of the display component.

It is to be understood that both the foregoing general descriptions and the following detailed descriptions are exemplary and intended to provide further explanations of the claimed technique.

DETAILED DESCRIPTION

Hereinafter, the embodiments of the present application will be described in detail with reference to the accompanying drawings.

First, a display component according to an embodiment of the present application will be described with reference to FIGS. 1 to 5. The display component according to an embodiment of the present application may be a transmissive display component like LCD, and may also be a reflective display component like LCOS. In addition, the display component according to an embodiment of the present application may directly display an image to be displayed for a user, and may also provide an image source to be displayed in for example a near-vision optical display system that adopts a light guide optical element (LOE), and thereafter other components in the optical system perform light path conversion and/or amplification on the image source provided by the display component according to an embodiment of the present application, so that the user can perceive.

Figure 1:
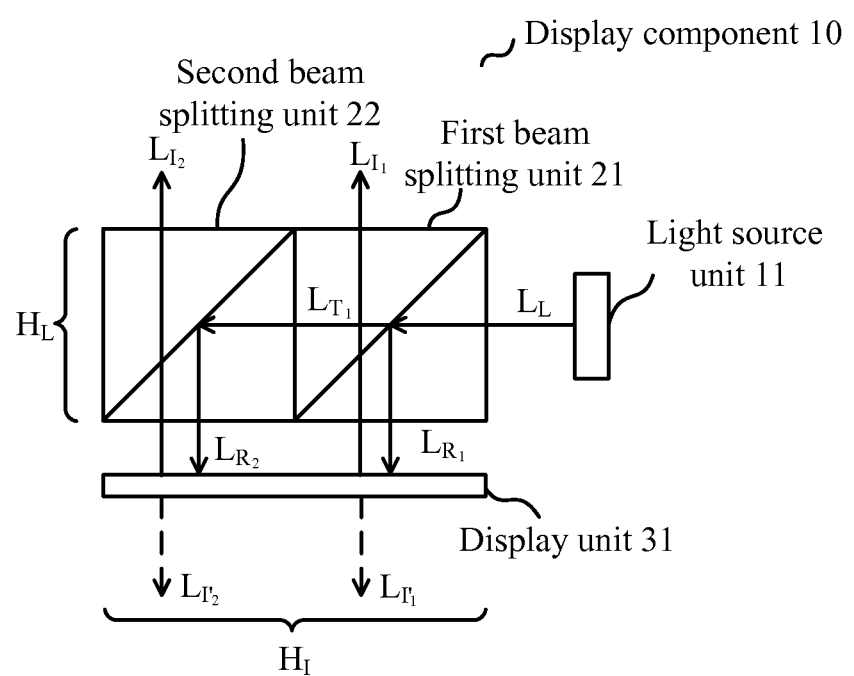
FIG. 1 is a schematic diagram illustrating the display component in a first example according to a first embodiment of the present application.

FIG. 1 is a schematic diagram illustrating the display component in a first example according to a first embodiment of the present application. As shown in FIG. 1, a display component 10 in the first example according to the first embodiment of the present application comprises a light source unit 11, at least two beam splitting units (i.e., first beam splitting unit 21 and second beam splitting unit 22 in FIG. 1), and a display unit 31.

Specifically, the light source unit 11 is configured to emit source light $L_L$. The source light $L_L$ is planar natural light. The first beam splitting unit 21 of the at least two beam splitting units is provided within an irradiation area of the source light $L_L$ and splits the source light $L_L$ into first reflected light $L_{R1}$ and first transmitted light $L_{T1}$, the second beam splitting unit 22 of the at least two beam splitting units is provided within an irradiation area of the first transmitted light $L_{T1}$ and at least partially converts the first transmitted light $L_{T1}$ into second reflected light $L_{R2}$. As shown in FIG. 1, a direction of the second reflected light $L_{R2}$ matches with a direction of the first reflected light $L_{R1}$, that is to say, the second reflected light $L_{R2}$ and the first reflected light $L_{R1}$ are approximately parallel light, an angle of traveling directions of the two is less than for example 5 degrees.

The display unit 31 is provided within an irradiation area of the first reflected light $L_{R1}$ and the second reflected light $L_{R2}$, and configured to receive the first reflected light $L_{R1}$ and the second reflected light $L_{R2}$ and adjust the first reflected light $L_{R1}$ and the second reflected light $L_{R2}$ to become initial light by adding information of an image to be displayed into the first reflected light $L_{R1}$ and the second reflected light $L_{R2}$. For example, the display unit 31 is the liquid crystal layer of the LCD display component, it can change an arrangement of internal molecules under control of a display drive voltage (not shown), cause the first reflected light $L_{R1}$ and the second reflected light $L_{R2}$ to become initial light corresponding to the image under irradiation of the first reflected light $L_{R1}$ and the second reflected light $L_{R2}$, by using the liquid crystal material to correspondingly block the first reflected light $L_{R1}$ and the second reflected light $L_{R2}$ or let the first reflected light $L_{R1}$ and the second reflected light $L_{R2}$ travel through.

In the display component 10 shown in FIG. 1, the exit direction of the initial light depends on the display principle of the display component 10 is reflective or trans missive. Specifically, in the case where the display component 10 is a reflective display component, the first reflected light $L_{R1}$ and the second reflected light $L_{R2}$ are reflected by the display unit 31 as the initial light $L_{I1}$ and $L_{I2}$, respectively. In the case where the display component 10 is a trans missive display component, the first reflected light $L_{R1}$ and the second reflected light $L_{R2}$ transmit through the display unit 31 and become the initial light $L_{I1}$ and $L_{I2}$, respectively.

As shown in FIG. 1, in the case where the first reflected light $L_{R1}$ and the second reflected light $L_{R2}$ are reflected by the display unit 31 as the initial light $L_{I1}$ and $L_{I2}$, respectively, the at least two beam splitting units 21 and 22 are within an irradiation area of the initial light $L_{I1}$ and $L_{I2}$, and a transmittance in the direction of the initial light $L_{I1}$ and $L_{I2}$ exceeds a first threshold, so that the initial light $L_{I1}$ and $L_{I2}$ can transmit through the at least two beam splitting units 21 and 22. The first threshold is for example 50%, and 80% in an embodiment.

In addition, as shown in FIG. 1, an angle between the direction of the initial light $L_{I1}$ and $L_{I2}$ and the direction of the source light $L_L$ satisfies a second threshold. Since the first reflected light $L_{R1}$ and the second reflected light $L_{R2}$ irradiate the display unit 31 approximately in parallel, respectively, the initial light $L_{I1}$ and $L_{I2}$ formed by the first reflected light $L_{R1}$ and the second reflected light $L_{R2}$ after transmitting through the display unit 31 are approximately in parallel with the source light $L_L$. That is to say, the second threshold is for example 80 to 100 degrees, and 85 to 95 degrees in an embodiment.

In addition, as shown in FIG. 1, a thickness $H_L$ of the at least two beam splitting units 21 and 22 in an exit direction of the initial light $L_{I1}$ and $L_{I2}$ is less than a width $H_I$ of the display unit 31 in an incident direction of the source light $L_L$. In an embodiment of the present application, each of the at least two beam splitting units 21 and 22 is cemented by two rectangular prisms, a cemented surface thereof is coated with at least one film layer that determines an intensity proportion of light reflected an transmitted by each of the at least two beam splitting units. That is to say, in such configuration, each of the at least two beam splitting units 21 and 22 is approximately a cube. Since the display component 10 in the first example according to the first embodiment of the present application is provided with at least two beam splitting units 21 and 22, each of the at least two beam splitting units 21 and 22 can generate the first reflected light $L_{R1}$ and the second reflected light $L_{R2}$ that coverablly irradiate the display unit 31, so that an overall thickness $H_L$ of the at least two beam splitting units 21 and 22 in an exit direction of the initial light $L_{I1}$ and $L_{I2}$ is a half of the width $H_I$ of the display unit 31 in an incident direction of the source light $L_L$, that is, $H_L \approx H_I/2$. However, if only a single beam splitting unit is configured to generate reflected light to coverablly irradiate the display unit 31, the thickness $H'_L$ of the single beam splitting unit in an exit direction of the initial light is approximately equal to the width $H_I$ of the display unit 31 in an incident direction of the source light $L_L$, that is, $H'_L \approx H_I$. Therefore, by configuring the at least two beam splitting units 21 and 22, an overall thickness of the beam splitting units in the initial light, which facilitates satisfying the requirement of miniaturizing the display component 10.

Further, as described above, the at least one film layer that is coated on the cemented surface of the beam splitting units determines an intensity proportion of light reflected an transmitted by each of the at least two beam splitting units 21 and 22, it is possible to configure ingredients of the at least one film layer, so that an intensity difference between the first reflected light $L_{R1}$ and the second reflected light $L_{R2}$ is less than a third threshold, and further, a difference between a maximum intensity and a minimum intensity in the initial light $L_{I1}$ and $L_{I2}$ is less than a fourth threshold. Specifically, the third threshold is for example 10%, and 5% in an embodiment. Accordingly, a difference ratio (Imax−Imin)/Imax between a maximum intensity Imax and a minimum intensity Imin in the initial light $L_{I1}$ and $L_{I2}$ is less than a fourth threshold, the fourth threshold is for example 10%, and 5% in an embodiment.

Further, no matter the display component 10 is a transmissive display component like LCD or a reflective display component like LCOS, it all needs polarized light to irradiate the display unit 31. Therefore, the at least two beam splitting units 21 and 22 are two polarization beam splitting units, so that light with a predetermined polarization direction is reflected as the first reflected light $L_{R1}$ and the second reflected light $L_{R2}$ on their beam splitting surfaces. In an embodiment of the present application, the at least two beam splitting units 21 and 22 both are to reflect S-polarized light on their beam splitting surfaces, and P-polarized light travels through their beam splitting surfaces. In this way, the first reflected light $L_{R1}$ and the second reflected light $L_{R2}$ are polarized light having an identical first polarized state, the first polarized state is an S-polarized state. A polarization converting unit configured in the display component will be further described with reference to the accompany drawings, so that the polarized state can be controlled accurately, thus implementing full utilization of the source light.

Figure 2:
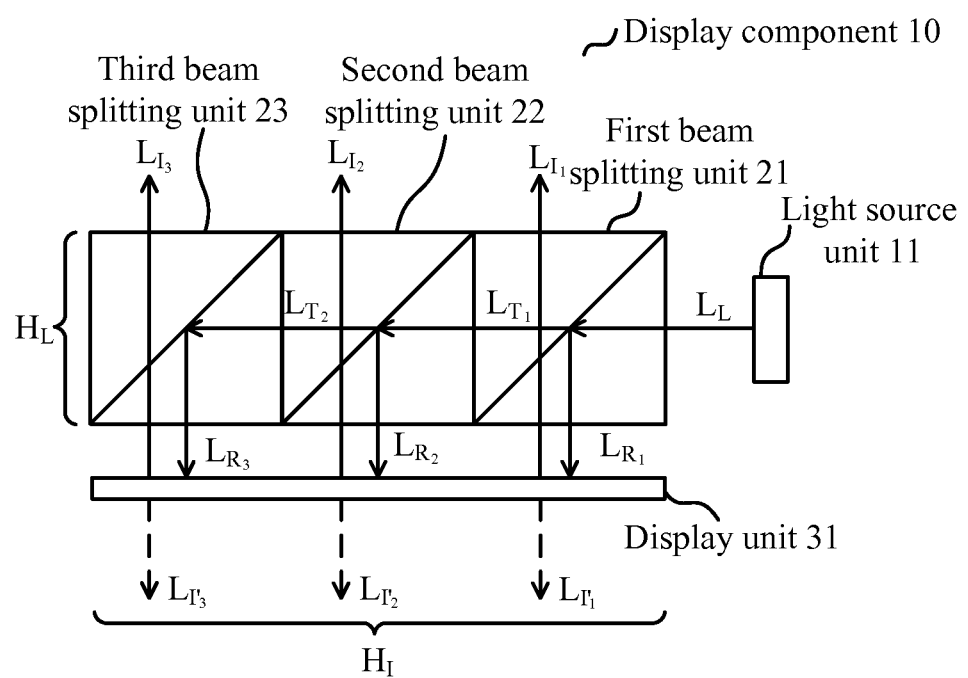
FIG. 2 is a schematic diagram illustrating the display component in a second example according to the first embodiment of the present application.

In the display component according to the first embodiment of the present application, number of the beam splitting units is not limited to two; FIG. 2 is a schematic diagram illustrating the display component in a second example according to the first embodiment of the present application. As shown in FIG. 2, in the display component 10 in the second example according to the first embodiment of the present application, the at least two beam splitting units further comprise a third beam splitting unit 23 provided within an irradiation area of the second transmitted light $L_{T2}$, and configured to at least partially convert the second transmitted light $L_{T2}$ to third reflected light $L_{R3}$ when the second beam splitting unit 22 splits the first transmitted light $L_{T1}$ into the second reflected light $L_{R2}$ and the second transmitted light $L_{T2}$, a direction of the third reflected light $L_{R3}$ matches with a direction of the first reflected light $L_{R1}$, the display unit 31 is located within an irradiation area of the third reflected light $L_{R3}$. As described above, the first reflected light $L_{R1}$, the second reflected light $L_{R2}$, and the third reflected light $L_{R3}$ are approximately parallel light, an angle of the traveling directions of any two is less than or equal to for example 5 degrees. In addition, the first reflected light $L_{R1}$, the second reflected light $L_{R2}$, and the third reflected light $L_{R3}$ are polarized light having an identical first polarized state, the first polarized state is S-polarized state.

Figure 3:
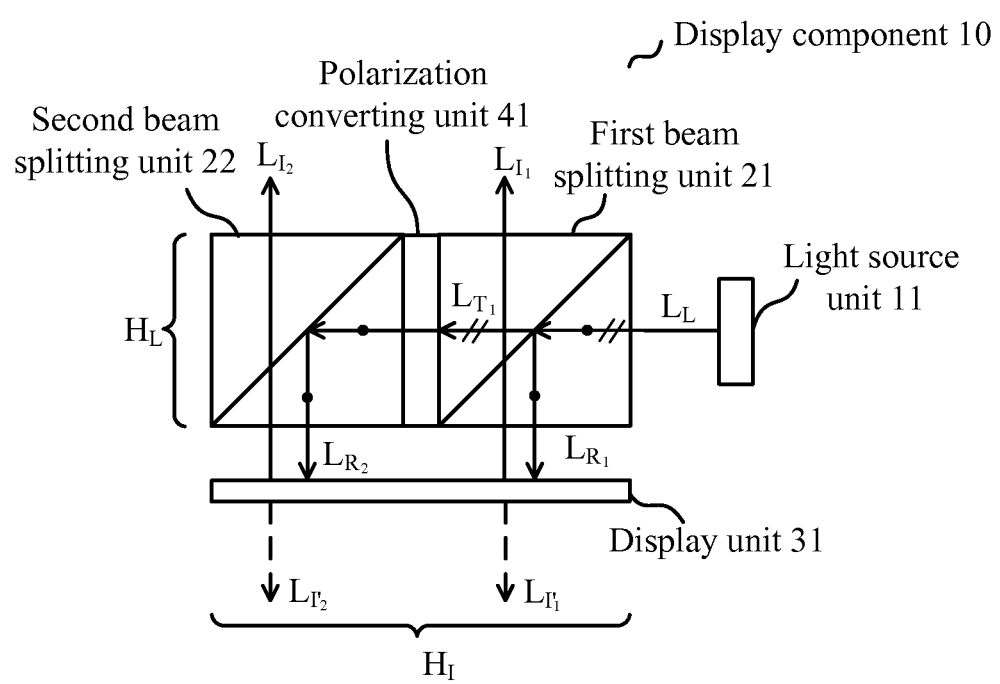
FIG. 3 is a schematic diagram illustrating the display component in a first example according to a second embodiment of the present application.

FIG. 3 is a schematic diagram illustrating the display component in a first example according to a second embodiment of the present application. As shown in FIG. 3, in comparison to the display component in the first example according to the first embodiment of the present application, the display component 10 in the first example according to the second embodiment of the present application further comprises a polarization converting unit 41. Generally, after a predetermined beam splitting unit of the at least two beam splitting unit completely reflects the polarized light in the first polarized state, the polarization converting unit 41 is provided within an irradiation area of polarized light transmitting through the predetermined beam splitting unit and in a second polarized state, and configured to convert the polarized light in the second polarized state to the polarized light in the first polarized state.

As shown in FIG. 3, with the at least two beam splitting units 21 and 22 as example, the light source unit 11 is configured to emit source light $L_L$, the source light $L_L$ includes polarized light in the first polarized state (S-polarized) and polarized light in the second polarized state (P-polarized). The source light $L_L$ is split by the first beam splitting unit 21 provided with the irradiation area of the source light $L_L$ as the first reflected light $L_{R1}$ and the first transmitted light $L_{T1}$, wherein the first reflected light $L_{R1}$ is the polarized light in the first polarized state (S-polarized), and the first transmitted light $L_{T1}$ is the polarized light in the second polarized state (P-polarized), intensity of the first reflected light $L_R$ that is the polarized light in the first polarized state (S-polarized) is approximately the same as intensity of the first transmitted light $L_{T1}$ that is the polarized light in the second polarized state (P-polarized), i.e., both are a half of the intensity of the source light $L_L$.

In this case, the first beam splitting unit 21 is the predetermined beam splitting unit, it completely reflects the polarized light in the first polarized state. The polarization converting 41 is provided within an irradiation area of the first transmitted light $L_{T1}$. The first transmitted light $L_{T1}$ that is the polarized light in the second polarized state (P-polarized) is converted by the polarization converting 41 into the polarized light in the first polarized state (S-polarized). The first transmitted light $L_{T1}$ that is the polarized light in the second polarized state (P-polarized) is converted by the second beam splitting unit into the polarized light in the first polarized state (S-polarized). The first transmitted light $L_{T1}$ that is the polarized light in the first polarized state (S-polarized) is split by the second beam splitting unit 22 as the second reflected light $L_{R2}$.

By configuring the polarization converting unit 41, it is possible to completely convert the source light $L_L$ into the polarized light in the first polarized state to irradiate the display unit 31, thus avoiding a loss of the polarized light in the second polarized state (P-polarized) of the source light $L_L$, and thereby improving an overall energy utilization of the display component.

Figure 4:
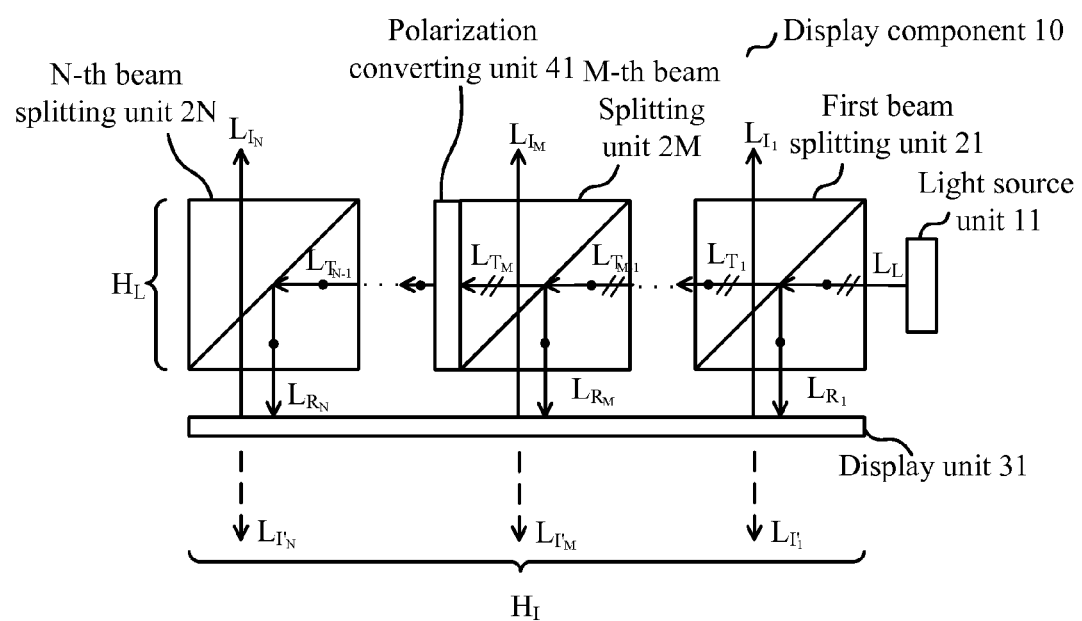
FIG. 4 is a schematic diagram illustrating the display component in a second example according to the second embodiment of the present application.

FIG. 4 is a schematic diagram illustrating the display component in a second example according to the second embodiment of the present application. As shown in FIG. 4, the display component 10 in the second example according to the second embodiment of the present application comprises a light source unit 11, at least two beam splitting units (i.e., N beam splitting units, the first beam splitting unit 21 to the N-th beam splitting unit, N is an even number larger than or equal to 2), a display unit 31, and a polarization converting unit 41.

The light source unit 11 is configured to emit source light $L_L$, the source light $L_L$ includes polarized light in the first polarized state (S-polarized) and polarized light in the second polarized state (P-polarized). The first beam splitting unit 21 splits the source light $L_L$ into the first reflected light $L_{R1}$ and the first transmitted light $L_{T1}$, wherein the first reflected light $L_{R1}$ is polarized light in the first polarized state (S-polarized), the first transmitted light $L_{T1}$ includes polarized light in the first polarized state (S-polarized) and polarized light in the second polarized state (P-polarized).

The (M−1)-th transmitted light $L_{TM-1}$ incident on the M-th beam splitting unit 2M includes polarized light in the first polarized state (S-polarized) and polarized light in the second polarized state (P-polarized), and is split by the M-th beam splitting unit 2M as M-th reflected light $L_{RM}$ and M-th transmitted light $L_{TM}$. The M-th reflected light $L_R$ is polarized light in the first polarized state (S-polarized), the M-th transmitted light $L_{TM}$ is polarized light in the second polarized state (P-polarized), that is, the M-th beam splitting unit 2M is the predetermined beam splitting unit that completely reflects the polarized light in the first polarized state (S-polarized) mentioned above, wherein M is equal to N/2. After the (N/2)-th beam splitting unit completely reflects the polarized light in the first polarized state (S-polarized), its transmitted light $L_{TM}$ is completely polarized light in the second polarized state (P-polarized). Therefore, the polarization converting unit 4 is provided within the irradiation area of the M-th transmitted light $L_{TM}$, so that the M-th transmitted light $L_{TM}$ of the polarized light in the second polarized state (P-polarized) is converted into the polarized light in the first polarized state (S-polarized). Thereafter, the (M+1)-th to the N-th beam splitting units respectively convert the M-th transmitted light $L_{TM}$ that is polarized light in the first polarized state (S-polarized) into the (M+1)-th reflected light $L_{RM+1}$ to the N-th reflected light $L_{RN}$. In this way, the first reflected light $L_{R1}$ to the N-th reflected light $L_{RN}$ all are polarized light having an identical first polarized state (S-polarized), and the source light $L_L$ is completely converted into the first reflected light $L_{R1}$ to the N-th reflected light $L_{RN}$, without energy loss.

Further, each of the N beam splitting units is cemented by two rectangular prisms, a cemented surface thereof is coated with at least one film layer that determines an intensity proportion of light reflected an transmitted by each of the N beam splitting units, so that intensity of light reflected by each of the N beam splitting units is I/N of the intensity of the source light. In this way, an intensity difference between the first reflected light $L_{R1}$ and the N-th reflected light $L_{RN}$ is less than a third threshold, and further, a difference between a maximum intensity and a minimum intensity in the initial light $L_{I1}$ to $L_{IN}$ corresponding to the first reflected light $L_{R1}$ to the N-th reflected light $L_{RN}$ is less than a fourth threshold. As described above, the third threshold is for example 10%, and 5% in an embodiment. Accordingly, a difference ratio (Imax−Imin)/Imax between a maximum intensity Imax and a minimum intensity Imin in the initial light $L_{I1}$ to $L_{IN}$ is less than a fourth threshold, the fourth threshold is for example 10%, and 5% in an embodiment.

As such, by configuring the N (N is an even number larger than or equal to 2) beam splitting units, and configuring the at least one film layer coated on the cemented surface of each beam splitting unit, each beam splitting unit reflects uniform illumination light with an intensity of I/N of the intensity of the source light $L_L$ towards the display unit 31. In addition, by providing the polarization converting unit 41 within an irradiation area of the transmitted light of the predetermined beam splitting unit (i.e., (N/2)-th beam splitting unit), the source light $L_L$ is completely converted into the polarized light in the first polarized state (S-polarized) to irradiate the display unit 31, thus avoiding a loss of the polarized light in the second polarized state (P-polarized) of the source light $L_L$, and thereby improving an overall energy utilization of the display component.

Further, similar to the description provided with reference to FIGS. 1 and 2, since the display component 10 in the second example according to the second embodiment of the present application are provided with N beam splitting units 21 to 2N, each of the N beam splitting units 21 to 2N can generate the first reflected light $L_{R1}$ to the N-th reflected light $L_{Rn}$ that coverably irradiate the display unit 31, so that the thickness $H_L$ of the N beam splitting units 21 and 2N in an exit direction of the initial light $L_{I1}$ to $L_{IN}$ is I/N of the width $H_I$ of the display unit 31 in an incident direction of the source light $L_L$, that is, $H_L \approx H_I/N$. Therefore, by configuring the N beam splitting units 21 to 2N, an overall thickness of the beam splitting units in the initial light is reduced, which facilitates satisfying the requirement of miniaturizing the display component 10.

Figure 5:
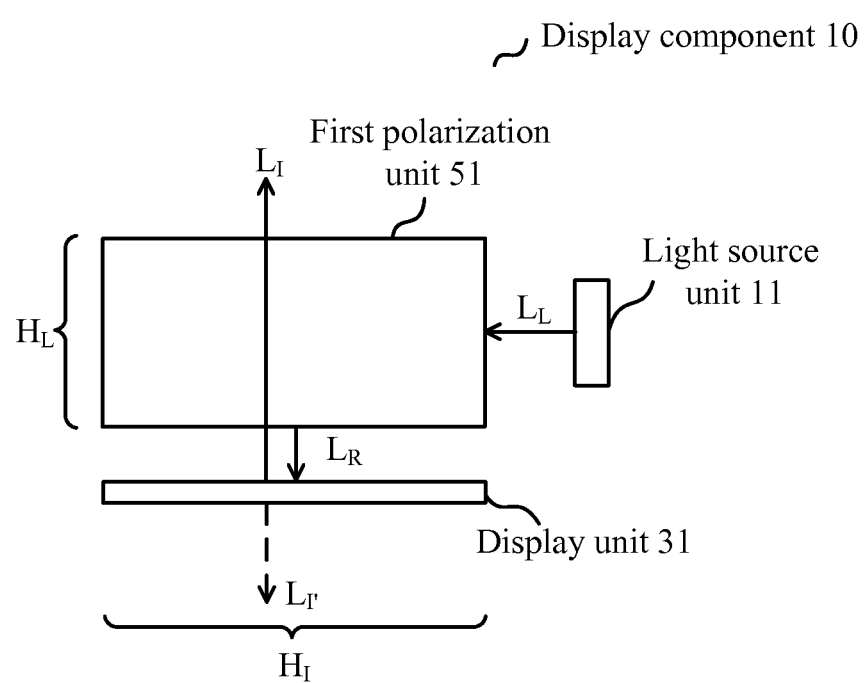
FIG. 5 is a schematic diagram illustrating the display component in an example according to a third embodiment of the present application.

FIG. 5 is a schematic diagram illustrating the display component in an example according to a third embodiment of the present application. As shown in FIG. 5, a display component 10 in an example according to the third embodiment of the present application comprises a light source unit 11, a first polarization unit 51, and a display unit 31.

Specifically, the light source unit 11 is configured to emit source light $L_L$. The source light $L_L$ is planar natural light. The first polarization unit 51 is provided within an irradiation area of the source light, and configured to at least partially convert the source light $L_L$ into first reflected light $L_R$, which is polarized light in a first polarized state.

The display unit 31 is provided within an irradiation area of the first reflected light $L_R$, and configured to adjust receive the first reflected light $L_R$ and adjust the first reflected light $L_R$ to become initial light by adding information of an image to be displayed into the first reflected light $L_R$. For example, the display unit 31 is the liquid crystal layer of the LCD display component, it can change an arrangement of internal molecules under control of a display drive voltage (not shown), cause the first reflected light $L_R$ to become initial light $L_I$ corresponding to the image under irradiation of the first reflected light $L_R$, by using the liquid crystal material to correspondingly block the first reflected light $L_R$ or let the first reflected light $L_R$ travel through. As shown in FIG. 5, a thickness $H_L$ of the first polarization unit 51 in an exit direction of the initial light $L_I$ is less than a width $H_I$ of the display unit in an incident direction of the source light $L_L$. This is because, if only one polarization beam splitting unit (PBS) is used to convert natural light into polarized light, this polarization beam splitting unit (PBS) needs two equilateral rectangular prisms cemented, in entirety it forms a structure that is approximately a cube, so that a thickness of the polarization beam splitting unit (PBS) in an exit direction of the initial light is equal to a width of the display unit 31 in an incident direction of the source light. However, when adopting the configuration of the first polarization unit 51 shown in FIG. 5, there is no need to adopt the structure that is approximately a cube, it is effectuated that a thickness $H_L$ of the first polarization unit 51 in an exit direction of the initial light $L_I$ is less than a width $H_I$ of the display unit in an incident direction of the source light $L_L$, which reduces an overall thickness of the first polarization unit in the initial light, and facilitates satisfying the requirement of miniaturizing the display component 10.

In addition, the initial light $L_I$ is light reflected by the display unit 31, and the first polarization unit 51 is within an irradiation area of the initial light $L_I$, and a transmittance in the direction of the initial light exceeds a first threshold, so that the initial light can transmit through the first polarization unit 51. The first threshold is for example 50%, and 80% in an embodiment. In addition, an angle between the direction of the initial light $L_I$ and the direction of the source light $L_L$ satisfies a second threshold. The second threshold is for example 80 to 100 degrees, and 85 to 95 degrees in an embodiment.

In the case where the first polarization unit 51 is a polarization beam splitting unit, the first polarization beam splitting unit 51 splits the source light into first reflected light and first transmitted light, the display component in an example according to the third embodiment of the present application further comprises: a second polarization beam splitting unit (not shown) provided within an irradiation area of the first transmitted light that transmits through the first polarization beam splitting unit 51, and configured to at least partially convert the first transmitted light into second reflected light, a direction of the second reflected light matches with a direction of the first reflected light, the display unit 31 is provided within an irradiation area of the first reflected light and the second reflected light, and causes the first reflected light and the second reflected light to become initial light corresponding to the image under irradiation of the first reflected light and the second reflected light. In this case, the display component in an example according to the third embodiment of the present application is equivalent to the display component in the first example according to the first embodiment of the present application as described above with reference to FIG. 1.

In the above, the display component according to an embodiment of the present application is described with reference to FIGS. 1 to 5, the display component according to an embodiment of the present application effectuates miniaturization of an overall volume, and takes full advantage of energy of the source light emitted by the light source unit, and meanwhile ensures a uniform illumination for the display unit. Hereinafter, an electronic device using the display component according to an embodiment of the present application will be further described with reference to FIGS. 6 to 22B.

Figure 6:
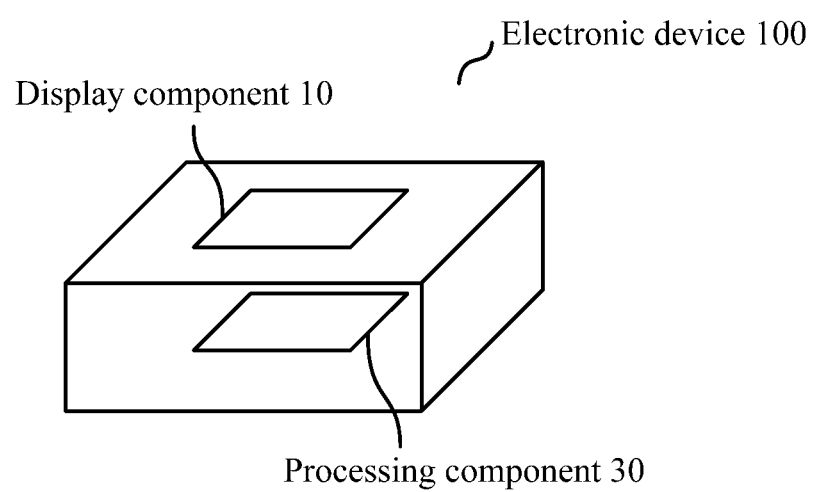
FIG. 6 is a structural block diagram illustrating an electronic device according to a fourth embodiment of the present application.

FIG. 6 is a structural block diagram illustrating an electronic device according to a fourth embodiment of the present application. As shown in FIG. 1, the electronic device 100 according to an embodiment of the present application comprises a processing component 30 and a display component 10.

Specifically, the processing component 30 is configured to generate a first image to be displayed and execute display control. In an embodiment of the present application, the processing component 30 may be a central processing unit (CPU) of the electronic device 100 or a special graphic processing unit (GPU) or other general or special processing units.

The display component 10 is configured to execute display of the first image. In an embodiment of the present application, the display component 10 may be a display component according to the first to third embodiments of the present application described above with reference to FIGS. 1 to 5. In an embodiment of the present application, the display component 10 may comprise a light source unit 11, at least two beam splitting units (i.e., first beam splitting unit 21 and second beam splitting unit 22 in FIG. 1), and a display unit (these units are not shown in FIG. 6). The light source unit configured to emit source light; a first beam splitting unit of the at least two beam splitting units is provided within an irradiation area of the source light and splits the source light into first reflected light and first transmitted light, a second beam splitting unit of the at least two beam splitting units is provided within an irradiation area of the first transmitted light and partially converts the first transmitted light into second reflected light, a direction of the second reflected light matches with a direction of the first reflected light; the display unit is provided within an irradiation area of the first reflected light and the second reflected light, and configured to receive the first reflected light and the second reflected light and adjust the first reflected light and the second reflected light to become initial light by adding information of an image to be displayed into the first reflected light and the second reflected light.

Specifically, the display component 10 as shown in FIG. 6 may be set within a display apparatus (not shown) of the electronic device 100. In an embodiment of the present application, the display apparatus may be a display apparatus having a near-vision optical display system that adopts a light guide optical element (OLE), it can provide the user with image or video display with a larger size or a higher resolution, break through the effect of size of the display unit per se.

Figure 7A:
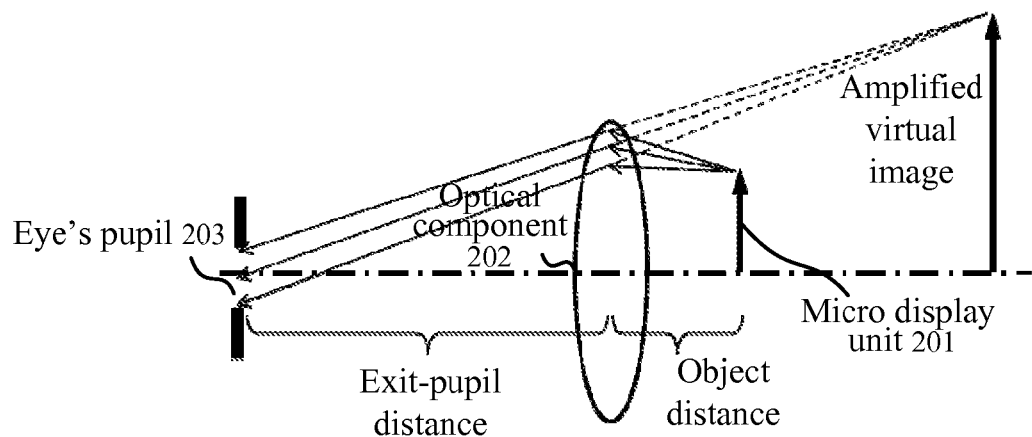
FIGS. 7A to 7D are schematic diagrams illustrating a near-vision optical display system adopted in the electronic device according to an embodiment of the present application.

FIG. 7A is a schematic diagram illustrating a near-vision optical display system adopted in the electronic device according to an embodiment of the present application. In the electronic device according to a first embodiment of the present application, a near-vision optical display system is adopted as the first display apparatus. As shown in FIG. 7A, light corresponding to the displayed image and emitted by a micro display unit 201 in the near-vision optical display system is received by a light path converting component 202 such as a lens group and the light path converting component 202 performs the corresponding light path conversion. As a result, light on which light path conversion has already been performed enters the viewer's pupil 203 to form a magnified virtual image. In FIGS. 7A to 7D, the micro display unit 201 is equivalent to the display component described above with reference to FIGS. 1 to 5.

Figure 7B:
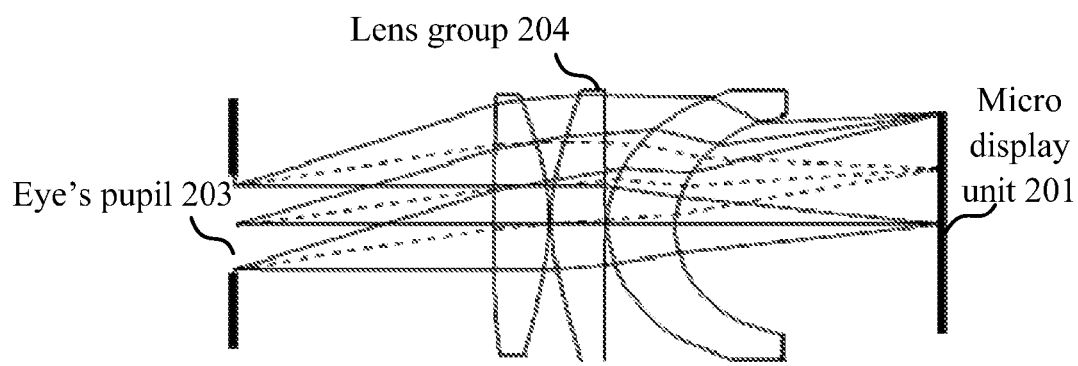
Figure 7C:
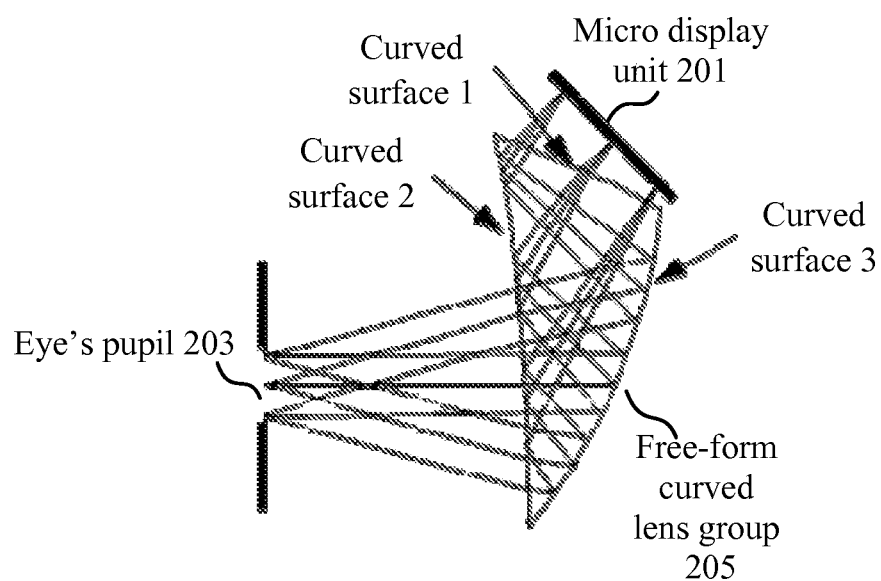
Figure 7D:
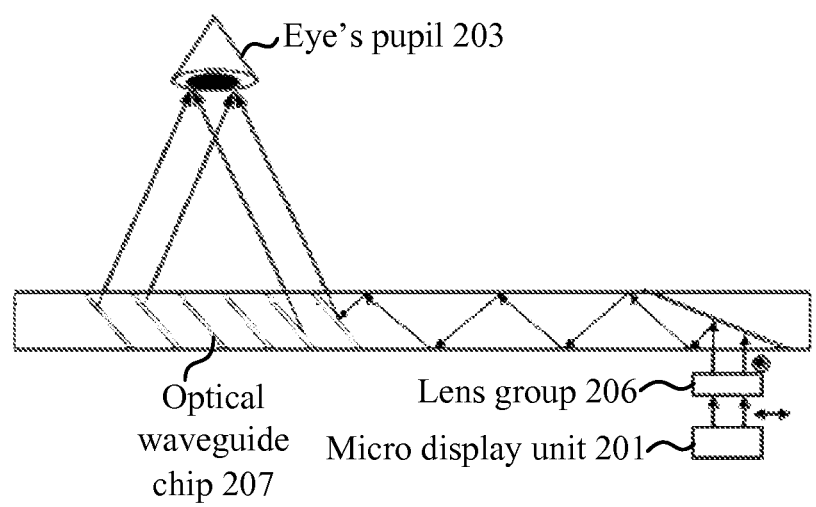

FIGS. 7B to 7D further illustrate three specific implementations based on the schematic diagram as shown in FIG. 7A. Specifically, the technical solution shown in FIG. 2B adopts a refractive-diffractive hybrid curved surface design, wherein the lens group 204 corresponds to the optical path converting component 202 shown in FIG. 7A, thereby the required lens volume is further reduced. The technical solution shown in FIG. 7C adopts a free-form curved surface design, wherein a free-form curved lens group 205 including a curved surface 1, a curved surface 2, and a curved surface 3 corresponds to the optical path converting component 202 shown in FIG. 7A, thereby the required lens volume is further reduced. The technical solution shown in FIG. 7D adopts a parallel plate design, which further includes an optical waveguide chip 207, in addition to the lens group 206 corresponding to the optical path converting component 202 shown in FIG. 7A. By using the optical waveguide chip 207, in the case of reducing thickness of the required lens, control like translation is performed on the exit direction of the light that forms the amplified virtual image (i.e., display direction of the magnified virtual image). As will be readily appreciated by those skilled in the art, the near-vision optical display system adopted in the electronic device according to the first embodiment of the present application is not limited to what is shown in FIGS. 7B to 7D, other implementations like a projection eyepiece design may also be adopted instead.

Figure 8A:
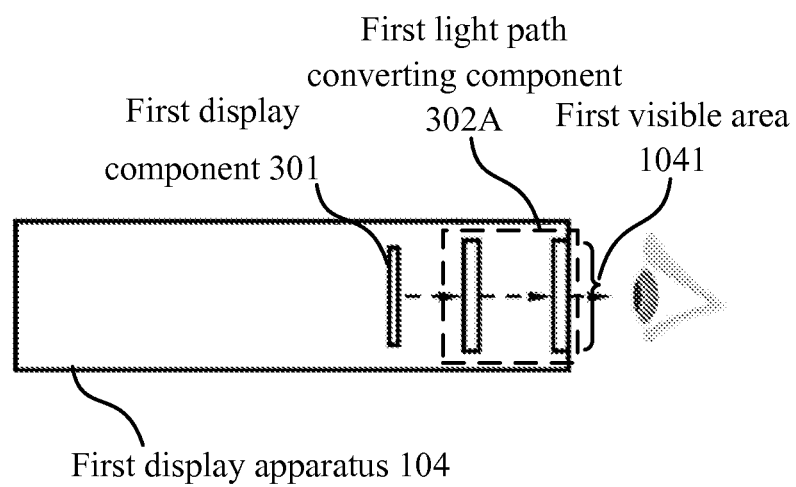
FIGS. 8A to 8C are schematic diagrams illustrating the first display apparatus in the electronic device according to an embodiment of the present application.
Figure 8B:
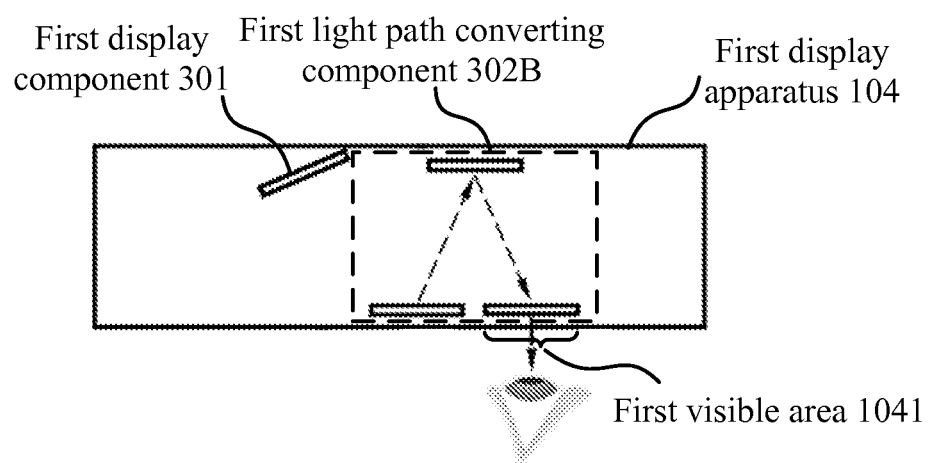
Figure 8C:
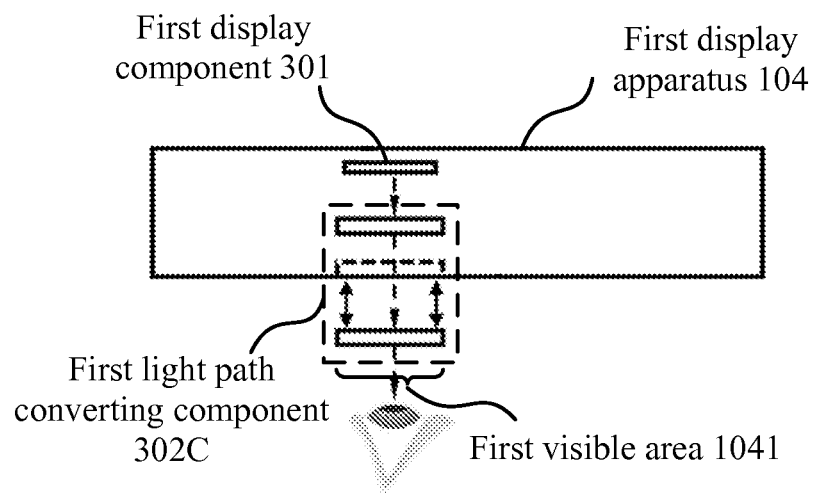

FIGS. 8A to 8C are schematic diagrams illustrating the first display apparatus in the electronic device according to an embodiment of the present application. The first display apparatus 104 in the electronic device 100 according to the first embodiment of the present application adopts the near-vision optical display system described above with reference to FIGS. 7A to 7D. The first display apparatus 104 includes a first display component 301 configured to display the first image and a first light path converting component 302 (first light path converting component 302A to 302C in FIGS. 8A to 8C) configured to receive and perform light path conversion on the light corresponding to the first image and emitted from the first display component 301 to thereby form an amplified virtual image corresponding to the first image, so that a viewer at a particular position perceives the virtual image corresponding to the first image, wherein a size of the virtual image perceived is greater than a display size of the display component.

Specifically, in FIG. 8A, the first display component 301 may be a micro display, and the first light path converting component 302A is formed by a lens group. The lens group forms an amplified image corresponding to the first image displayed by the first display component 301.

In FIG. 8B, also, the first display component 301 may be a micro display, and the first light path converting component 302B is formed by optical devices that perform multiple reflections within the device. In this case, as compared with the first light path converting component 302A as shown in FIG. 8A, space required by the first display apparatus 104 can be saved, thereby facilitating design and manufacture of a more miniaturized electronic device.

In FIG. 8C, also, the first display component 301 may be a micro display, and the first light path converting component 302C is formed by a zooming lens group that performs telescopic zooming under driving of a drive unit (not shown) within the device. In this case, as compared with the first light path converting component 302A as shown in FIG. 8A, it is possible to dynamically adjust size of the amplified virtual image displayed by the first display apparatus 104 through zooming, thereby meeting different requirements of the user. In FIGS. 8A to 7C, the display component 301 is equivalent to the display component described above with reference to FIGS. 1 to 5

Further, the electronic device 100 shown in FIG. 6 may be a wearable electronic device or any other type of electronic device. Those skilled in the art will readily appreciate that, in the case of applying the display apparatus according to an embodiment of the present application to a wearable electronic device, the wearable electronic device may be, but not limited to, a headset or wrist-mounted electronic device. For the sake of convenience of description, description is provided with the wearable electronic apparatus like a smart watch as example.

Figure 9A:
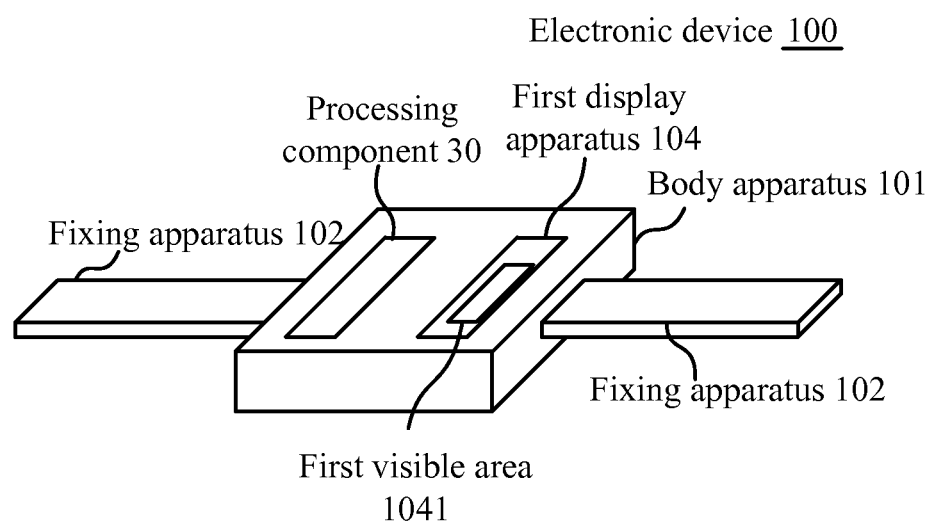
FIGS. 9A to 9E are structural block diagrams further illustrating the electronic device according to an embodiment of the present application.

FIGS. 9A to 9E are structural block diagrams illustrating an electronic device according to an embodiment of the present application. As shown in FIG. 9A, an electronic device 100 according to an embodiment of the present application comprises a body apparatus 101 and a fixing apparatus 102. The fixing apparatus 102 is connected with the body apparatus 101 and configured to fix a position relationship relative to a viewer of the electronic device 100. The fixing apparatus 102 includes at least a fixed state in which the fixing apparatus 102 can serve as at least a portion of an annular space or an approximate annular space that satisfies a first predetermined condition, the annular space or the approximate annular space can surround periphery of a columnar body that satisfies a second predetermined condition.

Figure 9B:
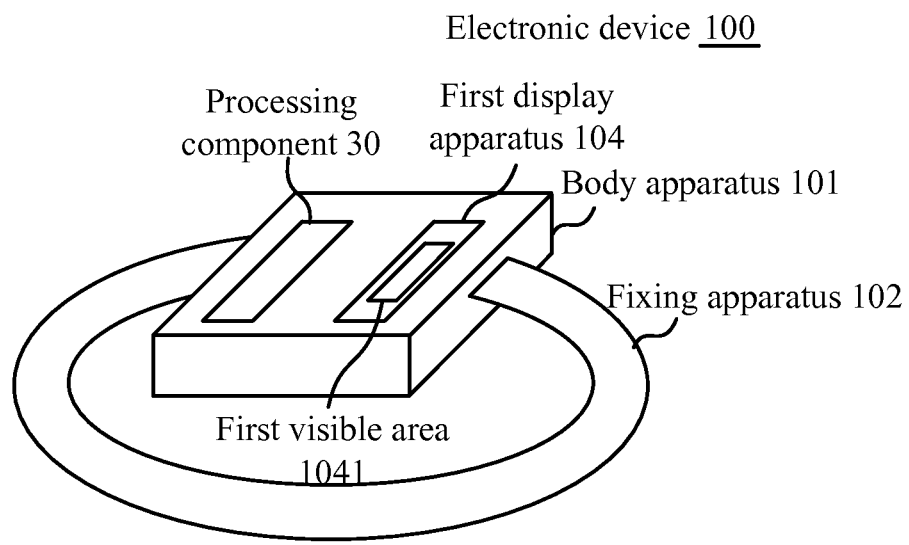
Figure 9C:
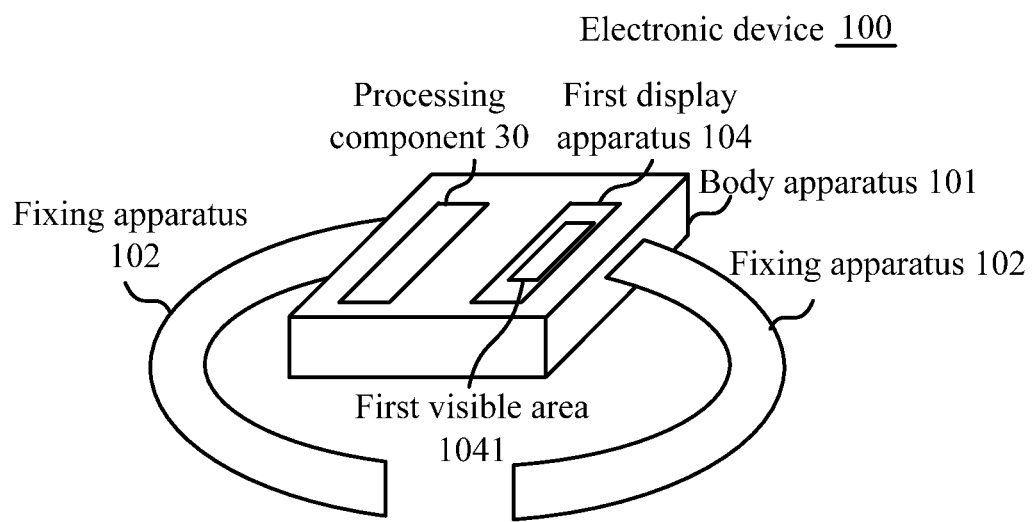

Specifically, FIGS. 9B and 9C respectively illustrate two fixed states that the fixing apparatus 102 is connected with the body apparatus 101. In a first fixed state as shown in FIG. 1B, the fixing apparatus 102 and the body apparatus 101 form a closed annular space, wherein the fixing apparatus 102 and the body apparatus 101 constitute a portion of the annular space, respectively. In a second fixed state as shown in FIG. 9C, the fixing apparatus 102 and the body apparatus 101 form an approximate annular space with a small opening, wherein the fixing apparatus 102 and the body apparatus 101 constitute a portion of the approximate annular space, respectively, a width of the small opening of the approximate annular space is less than a diameter of the columnar body (i.e., the first predetermined condition). In an embodiment of the present application, the body apparatus 101 is a dial portion of a smart watch, and the fixing apparatus 102 is a strap portion of the smart watch. The annular space or the approximate annular space formed by the fixing apparatus 102 and the body apparatus 101 can surround the wrist of the user of the smart watch which serves as the columnar body, and a diameter of the annular space or the approximate annular space is greater than a diameter of the user's wrist and smaller than a diameter of the user's first (i.e., the second predetermined condition).

Figure 9D:
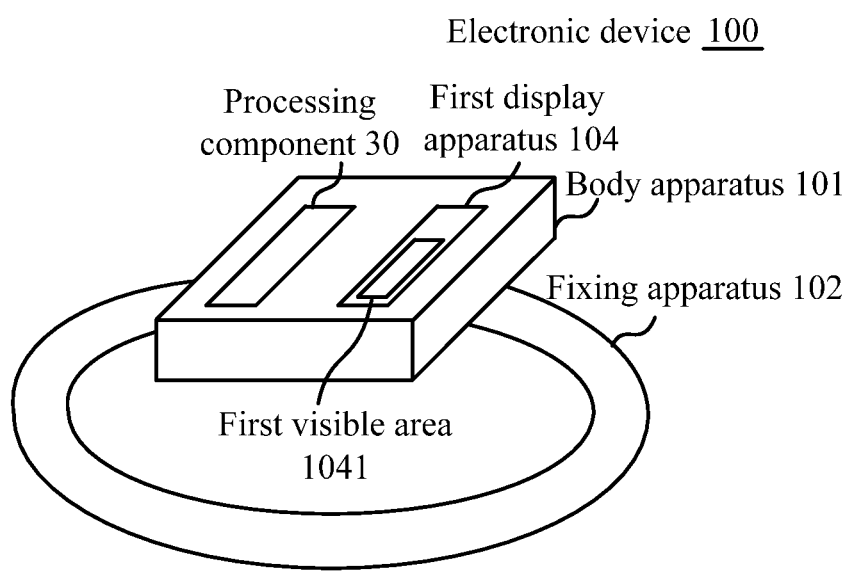
Figure 9E:
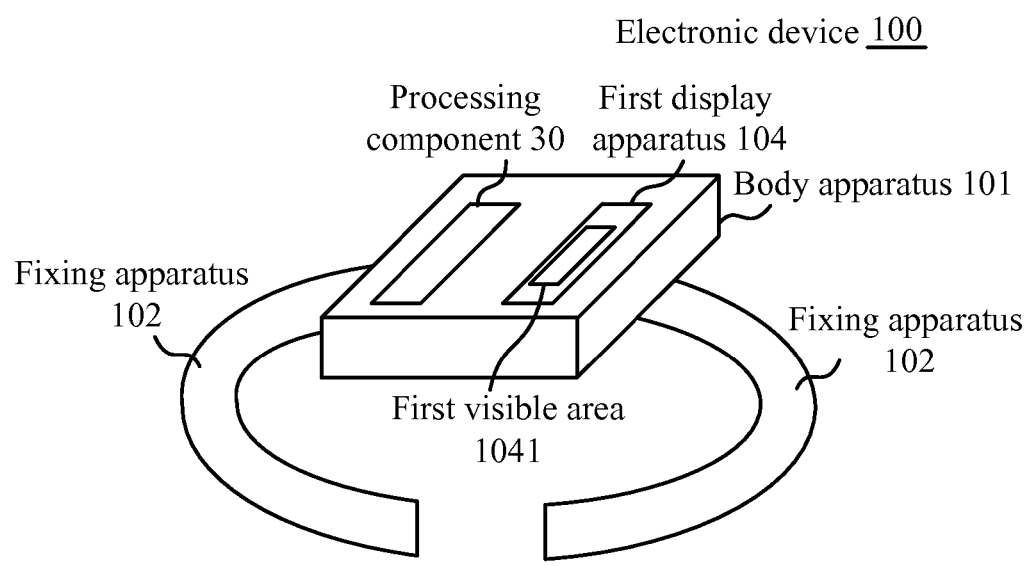

Further, of course, the annular space or the approximate annular space may be formed by the fixing apparatus 102 alone. As shown in FIGS. 9D and 9E, the body apparatus 101 may be provided on the fixing apparatus 102 (i.e., the body apparatus 101 is attached to the fixing apparatus 102 in the manner of surface contact), so that the fixing apparatus 102 alone forms the annular space (FIG. 9D) or the approximate annular space (FIG. 9E) that surrounds the columnar body. The fixing apparatus 102 is arranged with a fixing mechanism like hasps, snaps, zippers and so on (not shown).

Further, as shown in FIGS. 9A to 9E, a processing unit 103 and a first display apparatus 104 are arranged on the body apparatus 101. The processing unit 103 is configured to generate a first image and execute display control. In the electronic device 100 shown in FIGS. 1A to 1E, the first display apparatus 104 is arranged on the body apparatus 101. However, as will be readily appreciated by those skilled in the art, the present application is not limited thereto, in another embodiment of the present application, the first display apparatus 104 may also be arranged on the fixing apparatus 102. In yet another embodiment of the present application, the first display apparatus 104 may also be arranged on the body apparatus 101 and the fixing apparatus 102. For example, as will be further described in detail, the first display apparatus 104 will further include a light path converting component and a display component, the light path converting component may be provided partially on the body apparatus 101 and partially on the fixing apparatus 102; the display component may be provided on the body apparatus 101 or the fixing apparatus 102 as needed. As will be readily appreciated, the display component may be the display component according to an embodiment of the present application as described above with reference to FIGS. 1 to 5.

Further, as shown in FIGS. 9A to 9E, the first display apparatus 104 includes a first visible area 1041, light corresponding to the first image exits from the first visible area 1041. The electronic device 100 has a first viewing area, a complete display content of the first image can be perceived when viewing the first visible area within the first viewing area.

Figure 10:
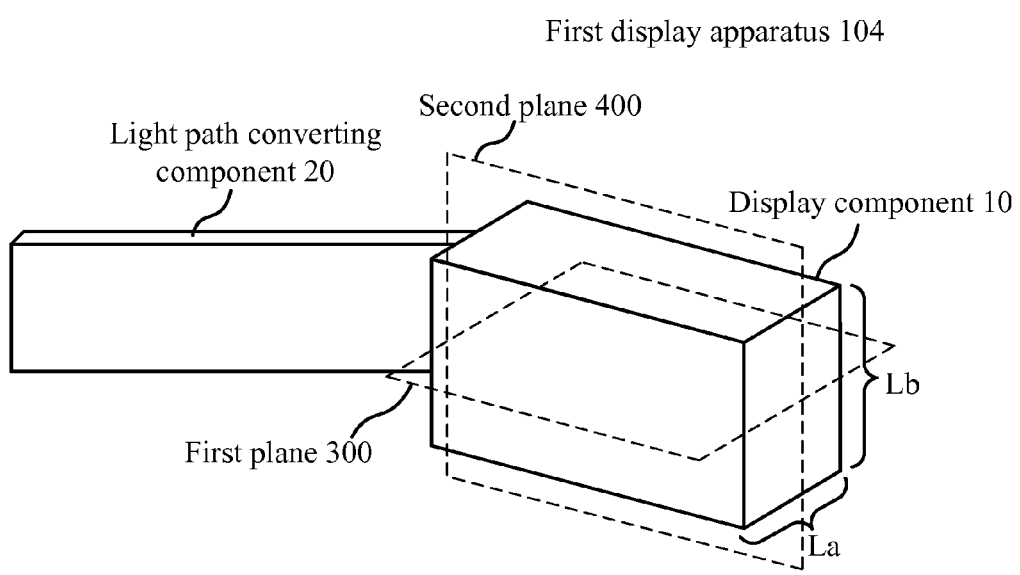
FIG. 10 is a structural block diagram illustrating the display apparatus in the electronic device according to an embodiment of the present application.

FIG. 10 is a structural block diagram illustrating a first display apparatus 104 according to an embodiment of present application. For simplicity of the illustration, FIG. 10 only illustrates the first display apparatus that includes the display component 10 and the light path converting component 20, internal configurations of the display component 10 and the light path converting component 20 as well as the light path are not shown in FIG. 10.

As illustrated in FIG. 10, light that forms the first image in the display component 10 is on a first plane 300, light that forms the virtual image corresponding to the first image and exits from the light path converting component 20 is on a second plane 400, there is a first angle between the first plane 300 and the second plane 400. In an embodiment of the present application, the first angle is 90 degrees. In this case, a first size La of the display component in a direction vertical to the first plane is made smaller than a second size Lb of the display component in a direction parallel to the first plane. Thus, when the display apparatus 104 is provided within a wearable electronic device, for example, when the electronic device is smart glasses, the display component 10 is provided within a frame at one side (i.e., glass leg) of the smart glasses, it is such configured so that thickness of the frame within which the display component 10 is provided is thinner. Similarly, when the electronic device is a smart watch, the display component 10 is provided within a wrist strap at one side of the smart watch, and it is such configured so that thickness of the wrist strap within which the display component 10 is provided is thinner. Accordingly, the display component 10 according to the first exemplary embodiment of the present application achieves a thickness reduction in a specific direction, and thereby achieves a thickness reduction in a specific direction where the display apparatus 104 is provided.

Figure 11A:
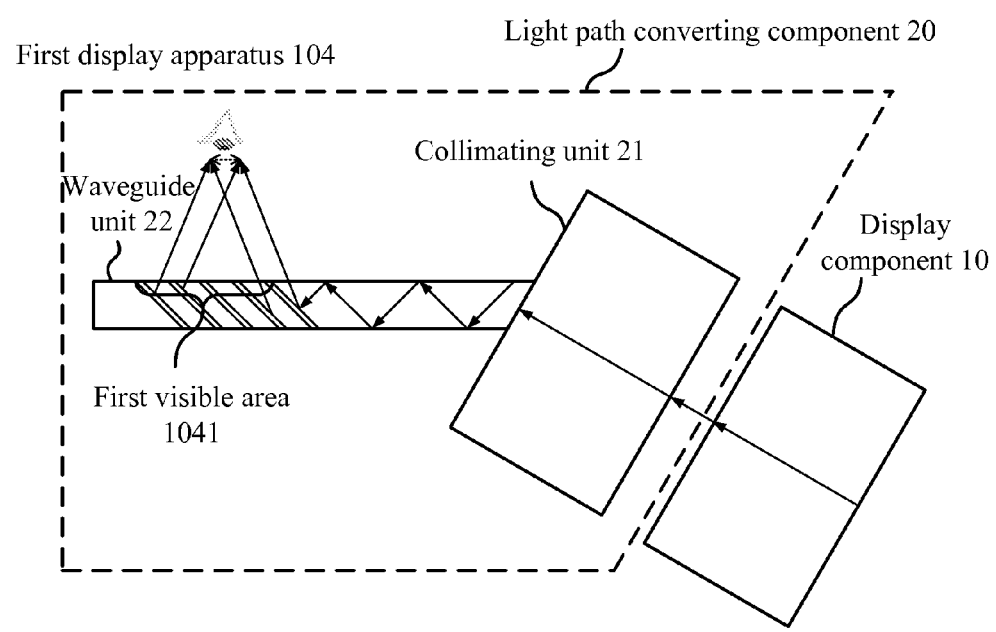
FIGS. 11A and 11B are structural block diagrams further illustrating the display apparatus in the electronic device according to an embodiment of the present application.
Figure 11B:
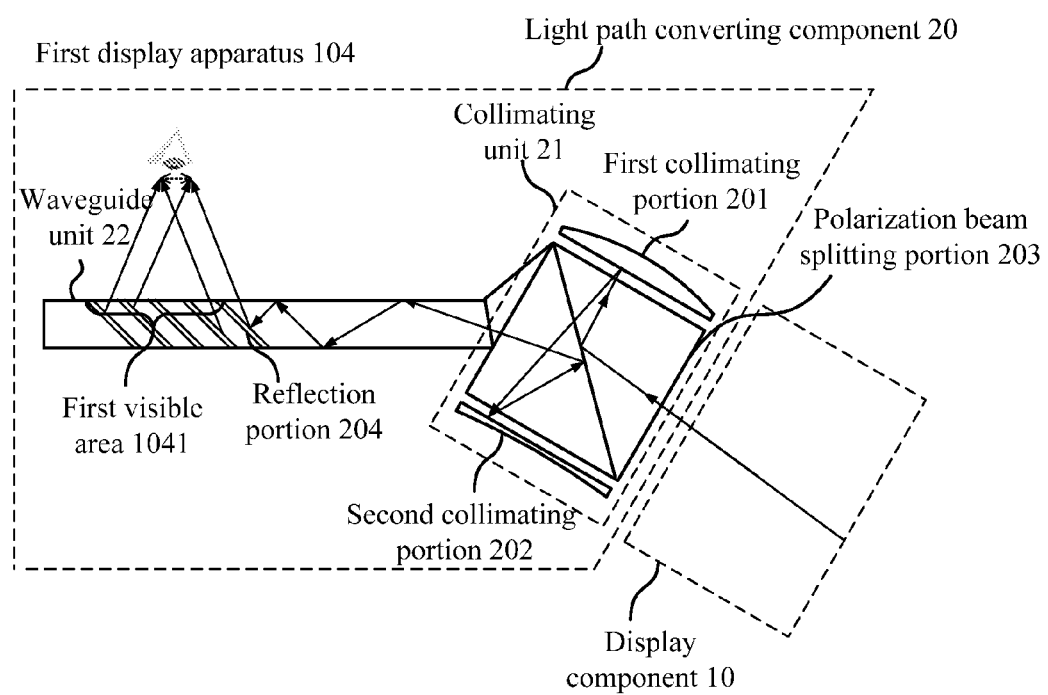

FIGS. 11A and 11B are structural block diagrams further illustrating the display apparatus in the electronic device according to an embodiment of the present application. As shown in FIG. 11A, the first the first display apparatus 104 includes a display component 10 and a light path converting component 20, the display component 10 is configured to display the first image, the light path converting component 20 is configured to perform light path conversion on the light corresponding to the first image and emitted from the display component 10 to form a magnified virtual image corresponding to the first image:

Further, as shown in FIG. 11B, the light path converting component 20 further includes a collimating unit 21 and a waveguide unit 22, the collimating unit 21 is configured to collimate the initial light corresponding to the first image and coming from the display component 10 into collimated light corresponding to the first image, and lead the same into the waveguide unit 22. Specifically, the collimating unit 21 includes a first collimating portion 201 and a second collimating portion 202 provided opposite to each other, and a polarization beam splitting portion 203 provided between the first collimating portion 201 and the second collimating portion 202, the initial light corresponding to the first image and coming from the display component 10 is reflected by the polarization beam splitting portion 203 to the first collimating portion 201, thereafter it is collimated by the first collimating portion 201 and the second collimating portion 202, and exited by the polarization beam splitting portion 203 as the collimated light corresponding to the first image. The waveguide unit 22 guides the collimated light corresponding to the first image and coming from the collimating unit 21 to the particular position, wherein the collimated light corresponding to the first image is for forming the virtual image corresponding to the first image. In an embodiment of the present application, the first collimating portion 201 and the second collimating portion 202 may be a single lens or a lens group as needed by design. It is possible to implement adjustment of a size of the virtual image corresponding to the first image by adjusting the relative position of the lens or lens group by which the first collimating portion 201 and the second collimating portion 202 are configured. In addition, as shown in FIG. 11B, the waveguide unit 22 further includes a plurality of reflection portions 204, it is possible to control to guide the collimated light from the collimating unit 21 and corresponding to the first image to the particular position to exit, by setting the position and angle of the plurality of reflection portions 204.

Figure 12A:
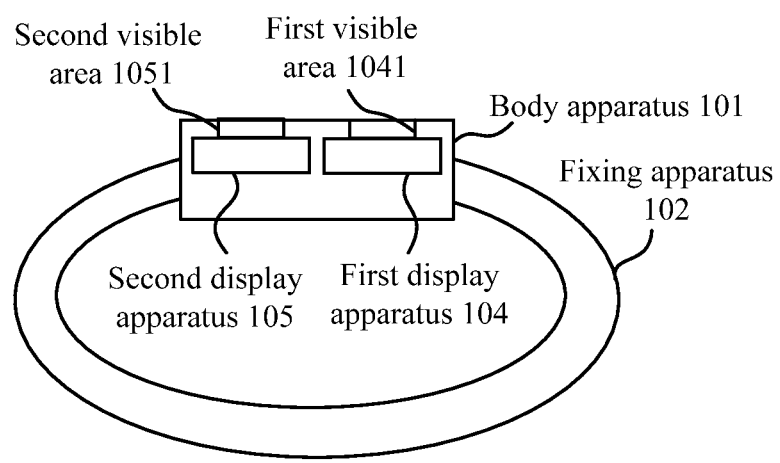
FIGS. 12A and 12B are structural block diagrams further illustrating the electronic device according to another embodiment of the present application.
Figure 12B:
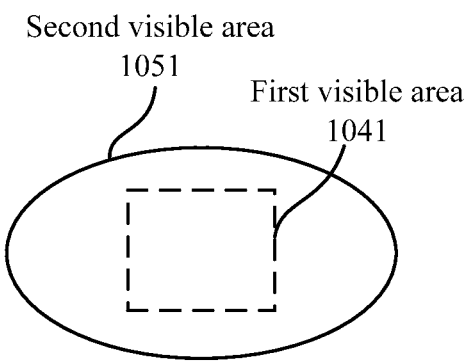

FIGS. 12A and 12B are structural block diagrams further illustrating the electronic device according to another embodiment of the present application. As shown in FIG. 12A, in addition to the first display apparatus 104 described above, a second display apparatus 105 is further included. The second display apparatus 105 is provided on the body apparatus 101 and/or the fixing apparatus 102 and configured to output a second image. In the example shown in FIG. 12A, the first display apparatus 104 and the second display apparatus 105 are set schematically in parallel. The present application is not limited thereto, the first display apparatus 104 and the second display apparatus 105 may be set overlapped or at least partially overlapped. Like the first display apparatus 104, the second display apparatus 105 has a second visible area 1051, light corresponding to the second image exits from the second visible area 1051.

In an embodiment of the present application, the first display apparatus 104 and the second display apparatus 105 are display units that follow different display principles. Specifically, the first display apparatus 104 is a display unit having a near-vision optical display system that adopts a light guide optical element (OLE), the second display apparatus 105 is an ordinary display like a liquid crystal display (LCD), an organic electroluminescent display, an E-ink display etc.

FIG. 12B schematically shows a cross-section shape of the first viewing area 1041 of the first display apparatus 104 and the second viewing area 1051 of the second display apparatus 105. As shown in FIG. 12B, the cross-section shape of the first viewing area 1041 may be a rectangular adaptive to the viewing habits that the user uses the first display apparatus 104 having a near-vision optical display system that adopts a light guide optical element (OLE). The cross-section shape of the second viewing area 1051 may be oval or circular adaptive to an outer shape of the wearable electronic device like a smart watch.

Figure 13:
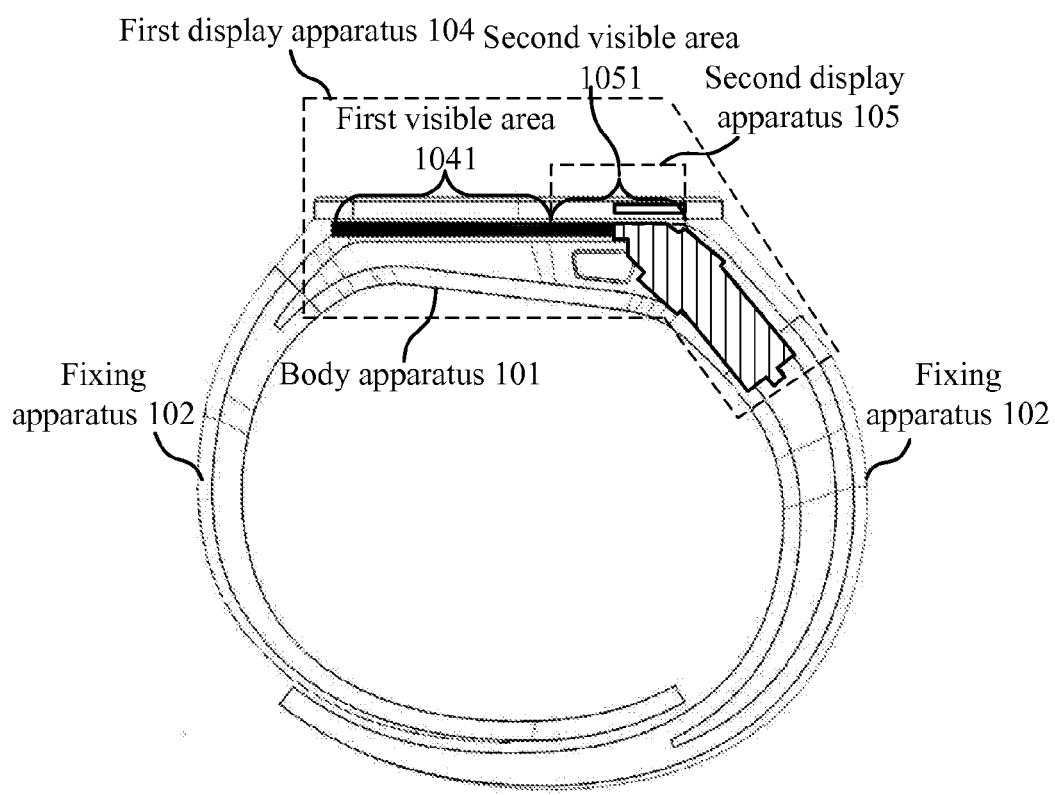
FIG. 13 is a structural perspective diagram illustrating the electronic device according to an embodiment of the present application.

FIG. 13 is a structural perspective diagram illustrating the electronic device according to an embodiment of the present application. As shown in FIG. 13, the first display apparatus 104 has a first visible area 1041, the second display apparatus 105 has a second visible area 1051, an edge where the first visible area 1041 and the second visible area 1051 border on each other is a curve. As can be seen from FIG. 13, in order to concurrently configure the first display apparatus 104 and the second display apparatus 105 in the electronic device 100, the second display apparatus 105 needs to satisfy being an irregular shape and a narrow frame.

Hereinafter, the second display apparatus 105 will be further described with reference to FIGS. 14 to 22B.

The second display unit according to an embodiment of the present application may be a second display unit such as a liquid crystal display, an LED display, a plasma display or the like to which a drive signal needs to be provided.

Figure 14:
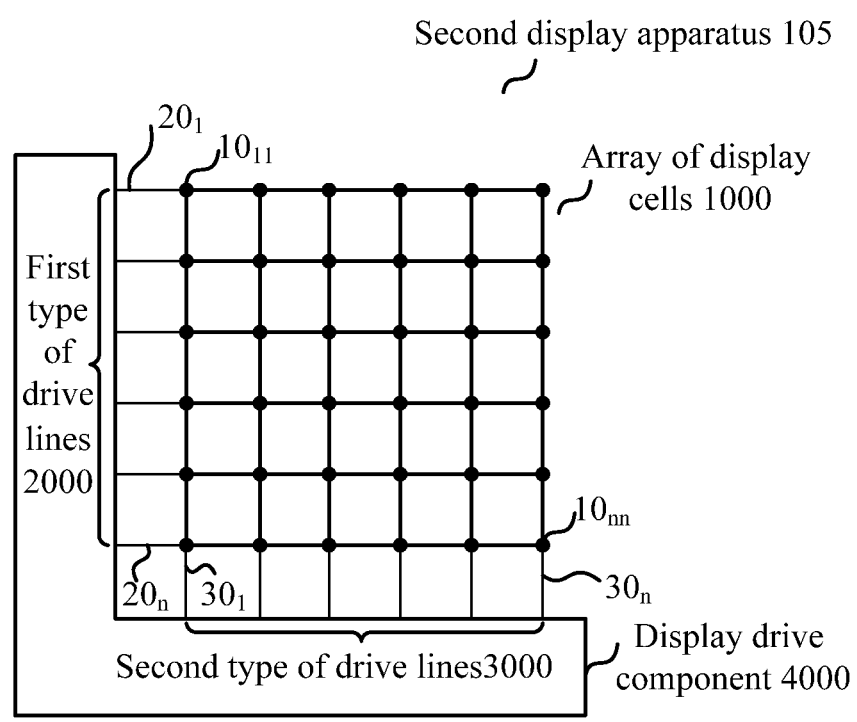
FIG. 14 is a structural block diagram briefly illustrating the second display apparatus according to an embodiment of the present application.

FIG. 14 is a structural block diagram briefly illustrating the second display unit according to an embodiment of the present application. As shown in FIG. 14, the second display apparatus 105 comprises an array of display cells 1000, a plurality of first type of drive lines 2000, a plurality of second type of drive lines 3000, and a display drive component 4000. Specifically, the array of display cells 1000 includes a plurality of display sub-units $10_{11} \ldots 10_{nm}$. As can be readily appreciated, the array of display cells 1000 composed by a plurality of display sub-units as shown in FIG. 14 is merely illustrative, wherein the number of the plurality of display sub-units and their specific layout may vary depending on the design and use requirements. Each $(20_1 \ldots 20_n)$ of the plurality of first type of drive lines 2000 intersects with each $(30_1 \ldots 30_n)$ of the plurality of second type of drive lines 3000, intersection thereof corresponds to each display sub-unit of the plurality of display sub-units $(10_{11} \ldots 10_{nm})$, so as to provide a display drive signal for each display sub-unit. The display drive component 4000 is connected with the plurality of first type of drive lines and the plurality of second type of drive lines, so as to provide a display drive signal for the plurality of first type of drive lines and the plurality of second type of drive lines.

Different than the configuration manner that a plurality of first type of drive lines and a plurality of second type of drive lines are connected respectively to a horizontal drive unit and a vertical drive unit in the related art, the second display apparatus 105 according to an embodiment of the present application may comprise only a single display drive component 4000, thereby wiring space needed for arranging the display drive component is saved and design complexity is simplified. In addition, in the second display apparatus 105 according to an embodiment of the present application, the plurality of first type of drive lines 2000 and the plurality of second type of drive lines 3000 are divided into at least two groups of drive lines, each group of the at least two groups of drive line is connected to the display drive component 4000. Such way of connecting the drive lines in group will greatly reduce the edge wiring of the second display apparatus 105, so that the frame that packets it can become narrow as much as possible and flexibly adapt to different frame shapes. Specific configurations of the second display unit according to the embodiment of the present application will be further described below with reference to FIGS. 15A to 22B.

Figure 15A:
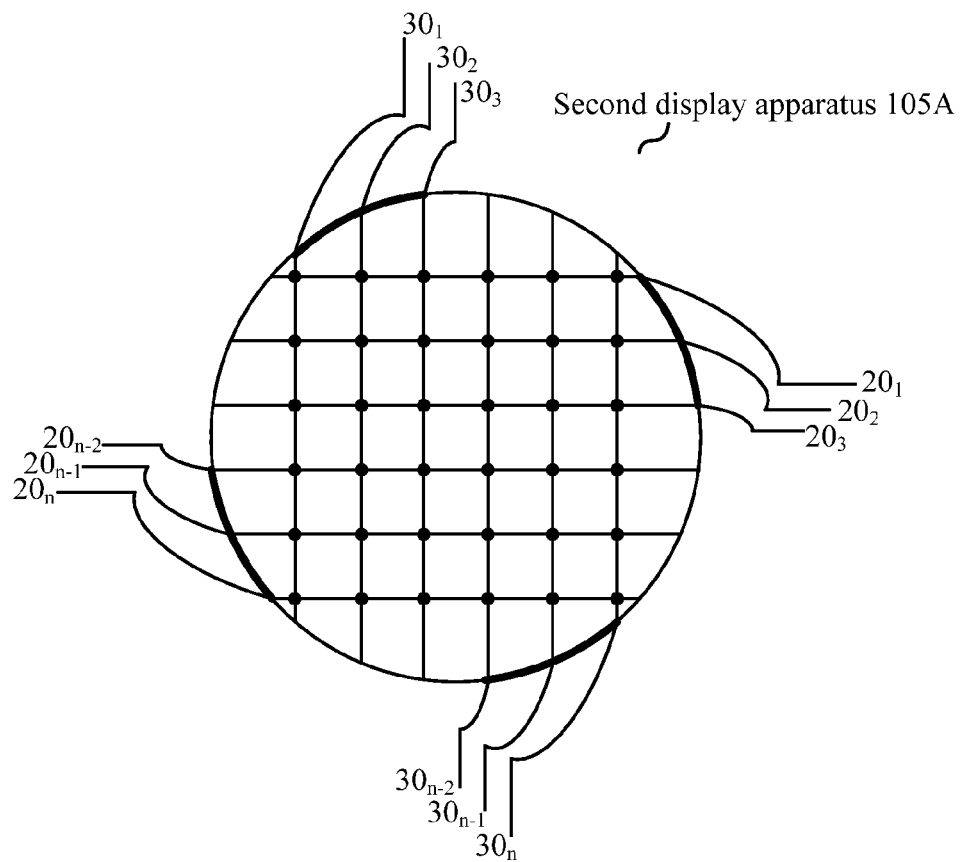
FIGS. 15A to 15C are a top surface view, a bottom surface view, and a side view illustrating a first example of the second display apparatus according to an embodiment of the present application.
Figure 15B:
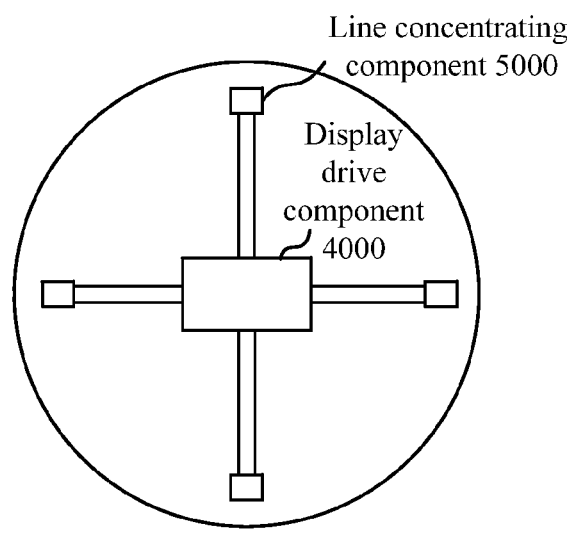
Figure 15C:
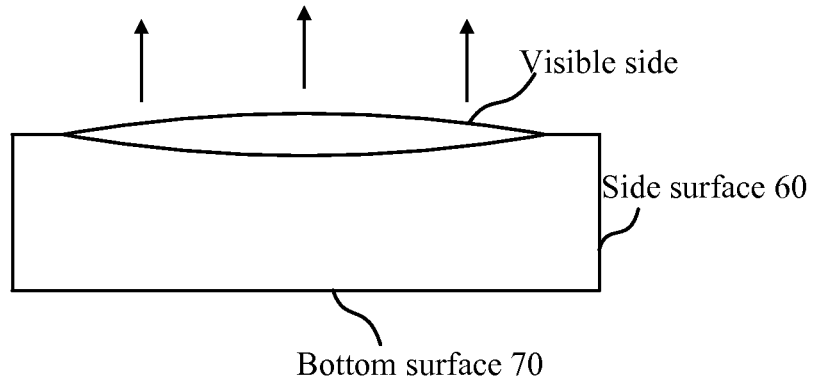

FIGS. 15A to 15C are a top surface view, a bottom surface view, and a side view illustrating a first example of the second display unit according to an embodiment of the present application. Specifically, FIG. 15A is a top surface view illustrating a second display apparatus 105A according to the first embodiment of the present application. As can be readily appreciated, the number of the drive lines and the wiring manner as shown in FIG. 15A are merely illustrative, the second display apparatus 105A according to an embodiment of the present application is not limited thereto. As shown in FIG. 15A, the plurality of first type of drive lines and the plurality of second type of drive lines are divided into a plurality of groups of drive lines (four groups as shown in FIG. 15A). As can be seen from FIG. 15A, by adopting such grouped wiring manner, the wiring area at the edge of the second display apparatus 105A tends to cluster, which thereby facilitates further narrowing the frame of the second display apparatus 105A. That is to say, in an electronic device where the second display apparatus 105A according to an embodiment of the present application is configured, the second display apparatus 105A can adapt to the shape of the electronic device as needed. Specifically, by adopting grouped configuration for the wiring of the second display apparatus 105A, it is possible to select the edge of the second display apparatus 105A that adapt to wiring based on the shape of the electronic device as the area where wiring groups are configured, and select not to configure wiring at the edge having no wiring space of the second display apparatus 105A based on the shape of the electronic device. Herein, the edge having no wiring space of the second display apparatus 105A may be an edge where the edge of the second display apparatus 105A substantially overlaps with the outer frame of the electronic device per se. Alternatively, the edge of having no wiring space the second display apparatus 105A may be an edge of the electronic device where the outer frame thereof is of an irregular shape and thus is inconvenient for wiring. Detailed examples will be described below with reference to the drawings.

Further, FIG. 15B is a bottom surface view illustrating a second display apparatus 105A according to the fourth embodiment of the present application. As shown in FIG. 15B, the second display apparatus 105A further comprises a plurality of line concentrating components 5000, each group of the plurality of groups of drive lines, into which the plurality of first type of drive lines and the plurality of second type of drive lines are divided, is connected to the display drive component 4000 via one of the line concentrating components 5000, number of input terminals of one of the line concentrating components 5000 connected with each group of the at least two groups of drive lines is M, number of output terminals connected to the display drive component 4000 is N, and M>N. In the embodiment shown in FIG. 15B, number of the input terminals by which one of the line concentrating components 5000 and one group of drive lines are connected is three, and number of the output terminals connected to the display drive component 4000 is two. Adopting such wiring manner of connecting the display drive unit via the line concentrating unit after grouping, it is possible to further reduce the number of wiring needed for executing display drive. Of course, as can be readily appreciated, the second display apparatus 105A according to an embodiment of the present application is not limited thereto; instead, the grouped group of drive lines may be directly connected to the display drive component 4000 without the line concentrating component 5000.

Furthermore, FIG. 15C is a side view illustrating a second display apparatus 105A according to the fourth embodiment of the present application. As shown in FIG. 15C, a side of the surface where the array of display cells 1000 residues is a visible side, and at least a portion of the plurality of first type of drive lines 2000 and the plurality of second type of drive lines 3000 and the display drive component 4000 are provided at the other side of the surface. In particular, the display drive component 4000 is located at a bottom surface 7000 of the second display apparatus 105A, the second display apparatus 105A further comprises a side surface 60 that connects an edge of the surface where the array of display cells 10 residues and the bottom surface 70, the plurality of first type of drive lines 2000 and the plurality of second type of drive lines 3000 are provided along the side surface 60. In the side view as shown in FIG. 15C, a distance from a projection, on a plane vertical to the visible direction (that is, the bottom surface 70), of part of the plurality of first type of drive lines 2000 and the plurality of second type of drive lines 3000 on the surface where the array of display cells 10 residues to the edge of the surface where the array of display cells 1000 residues is L. The distance L satisfies being less than a predetermined threshold. The predetermined threshold may be set as needed by design and display requirements, for example, it may be set as ten mm, five mm, or one mm. Even in the case of grouped wiring, the distance L may be zero. That is to say, at the edge where the drive lines do not turn downward so as to connect the display drive component 4000, it is possible that there is no wiring for the drive lines, and at the edge of this portion, the frame other than the visible area on the surface where the array of display cells 1000 residues is the narrowest.

Figure 16A:
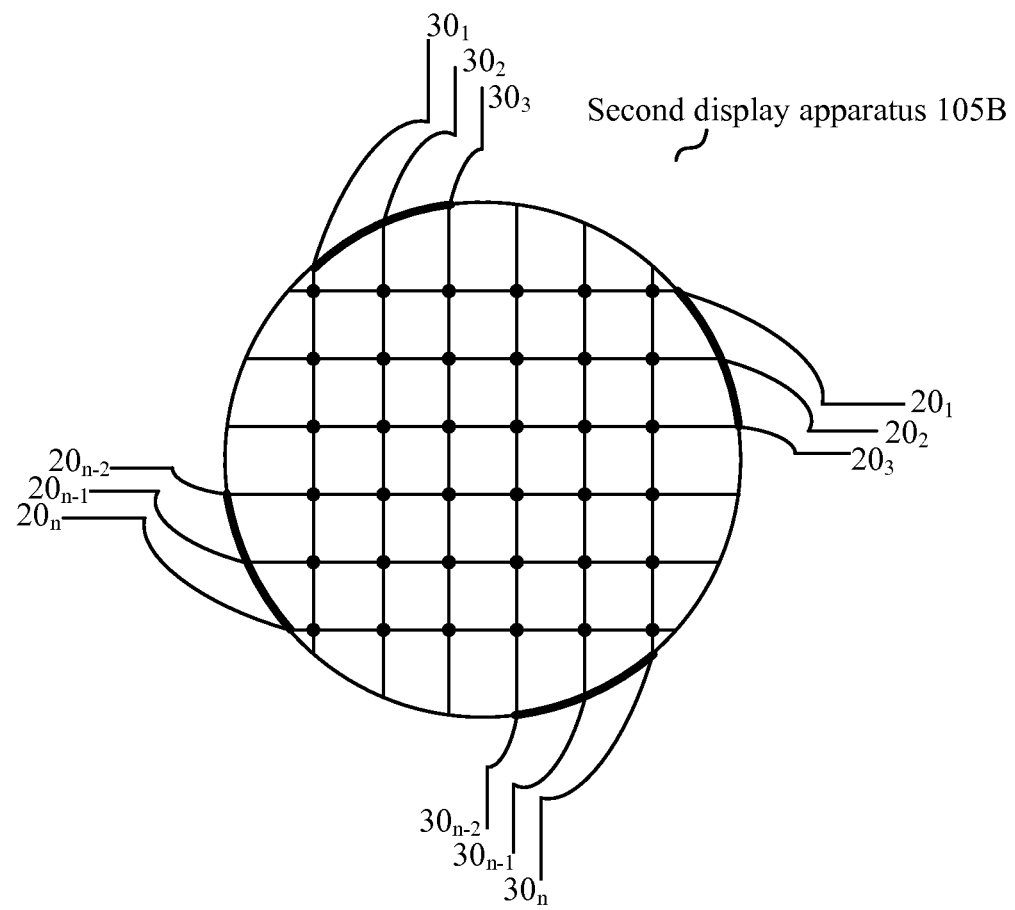
FIGS. 16A to 16B are schematic diagrams illustrating a second example of the second display apparatus according to an embodiment of the present application.
Figure 16B:
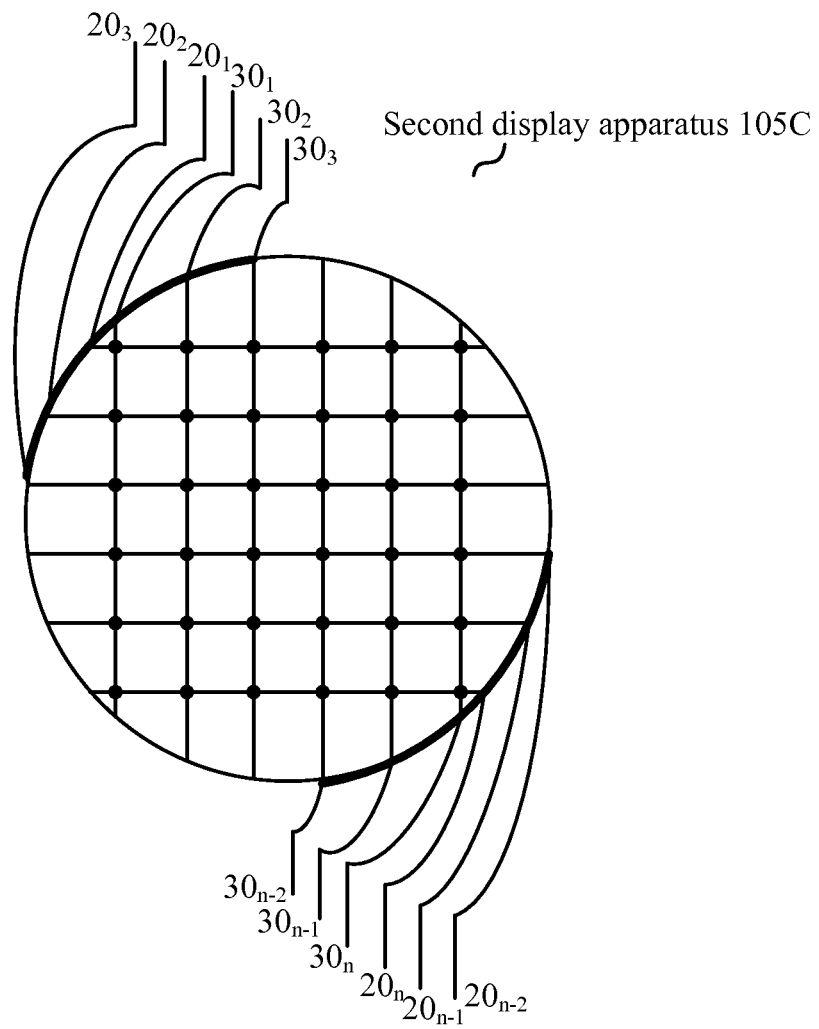

FIGS. 16A to 16B are schematic diagrams illustrating a second example of the second display unit according to an embodiment of the present application. In the second display units 105B and 105C according to the embodiment of the present application, each group into which the plurality of first drive lines and the plurality of second drive lines are divided may include only the first type of drive lines or the second type of drive lines, or each group into which the plurality of first drive lines and the plurality of second drive lines are divided may include the first type of drive lines and the second type of drive lines. Specifically, as shown in FIG. 16A, in the second display apparatus 105B according to the embodiment of the present application, each group into which the plurality of first drive lines and the plurality of second drive lines are divided may include only the first type of drive lines (the group composed by $20_1, 20_2, 20_3$ and the group composed by $20_{n-2}, 20_{n-1}, 20_n$) or the second type of drive lines (the group composed by $30_1, 30_2, 30_3$ and the group composed by $30_{n-2}, 30_{n-1}, 30_n$). In contrast, as shown in FIG. 13B, in the second display units 105C according to the embodiment of the present application, each group into which the plurality of first drive lines and the plurality of second drive lines are divided may include the first type of drive lines (the group composed by $20_1, 20_2, 20_3, 30_1, 30_2, 30_3$) and the second type of drive lines (the group composed by $20_{n-2}, 20_{n-1}, 20_n, 20_{n-2}, 30_{n-1}, 30_n$). As can be seen from FIGS. 186 to 16B, adopting such grouped wiring manner, the grouping manner of the plurality of first drive lines and the plurality of second drive lines is more flexible, the drive lines can be selected to compose the group as needed by design and display requirements, without being restricted by the type of the drive lines per se.

Figure 17A:
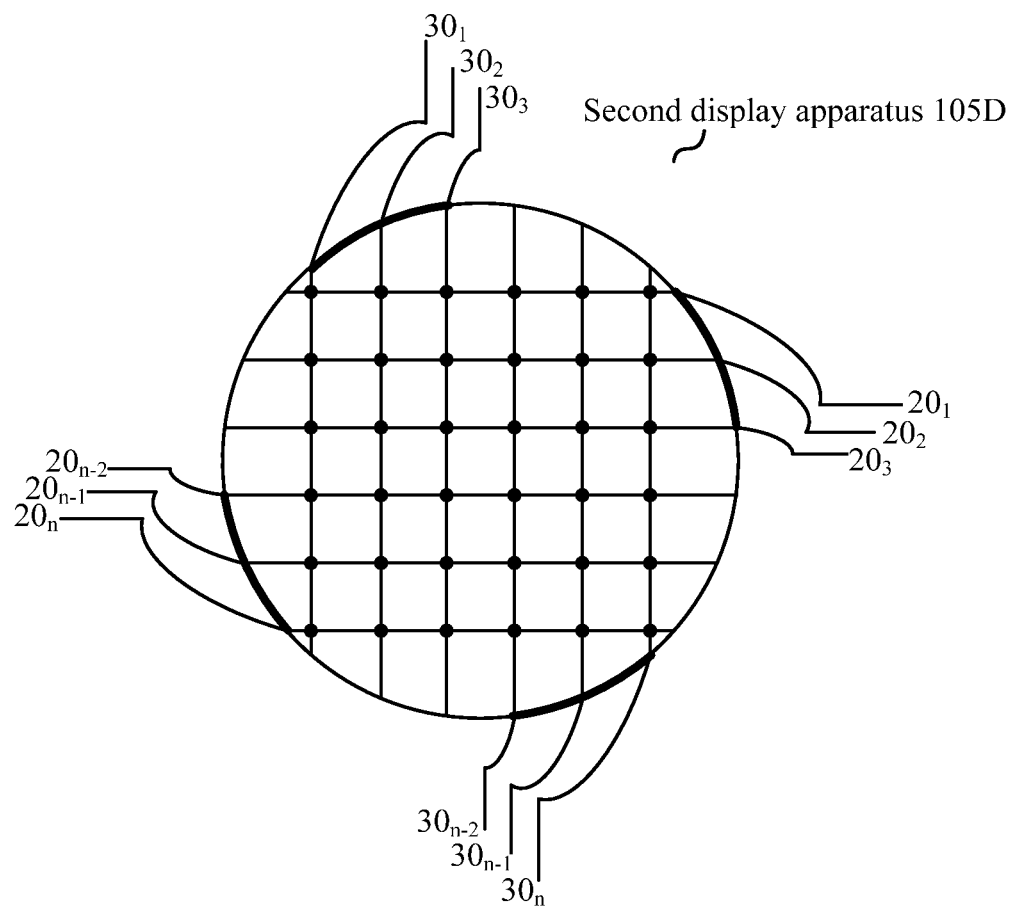
FIGS. 17A to 17B are schematic diagrams illustrating a third example of the second display apparatus according to an embodiment of the present application.
Figure 17B:
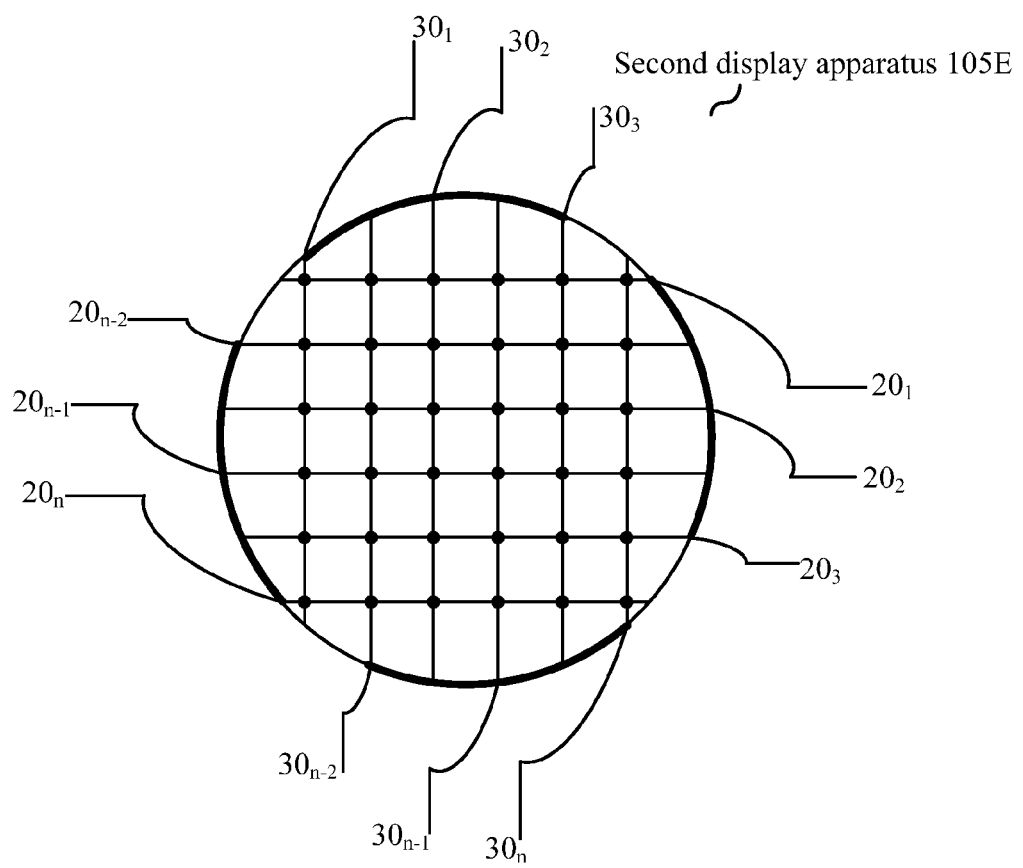

FIGS. 17A to 17B are schematic diagrams illustrating a third example of the second display unit according to an embodiment of the present application. In the second display units 105D and 105E according to the embodiment of the present application, each group into which the plurality of first drive lines and the plurality of second drive lines are divided may include only adjacent drive lines, or each group into which the plurality of first drive lines and the plurality of second drive lines are divided may include drive lines that are not adjacent. Specifically, as shown in FIG. 17A, in the second display apparatus 105D according to the embodiment of the present application, each group into which the plurality of first drive lines and the plurality of second drive lines are divided may include only adjacent drive lines (e.g., the group composed by adjacent $20_1, 20_2, 20_3, 20_{n-2}, 20_{n-1}, 20_n$; $30_1, 30_2, 30_3$; $30_{n-2}, 30_{n-1}, 30_n$). In contrast, as shown in FIG. 17B, in the second display apparatus 105E according to the embodiment of the present application, each group into which the plurality of first drive lines and the plurality of second drive lines are divided may include drive lines that are not adjacent (e.g., the group composed by $20_1, 20_3, 20_5$; $20_{n-4}, 20_{n-2}, 20_n$; $30_1, 30_3, 30_5$; and $30_{n-4}, 30_{n-2}, 30_n$ that are not adjacent). As can be seen from FIGS. 17A and 17B, adopting such grouped wiring manner, the grouping manner of the plurality of first drive lines and the plurality of second drive lines is not limited to grouping the adjacent drive lines, instead it is possible to select the drive lines that are not adjacent to group as needed by design and display requirements, thus avoiding selecting the narrow frame portion of the display device to perform wiring of the drive lines.

Figure 18:
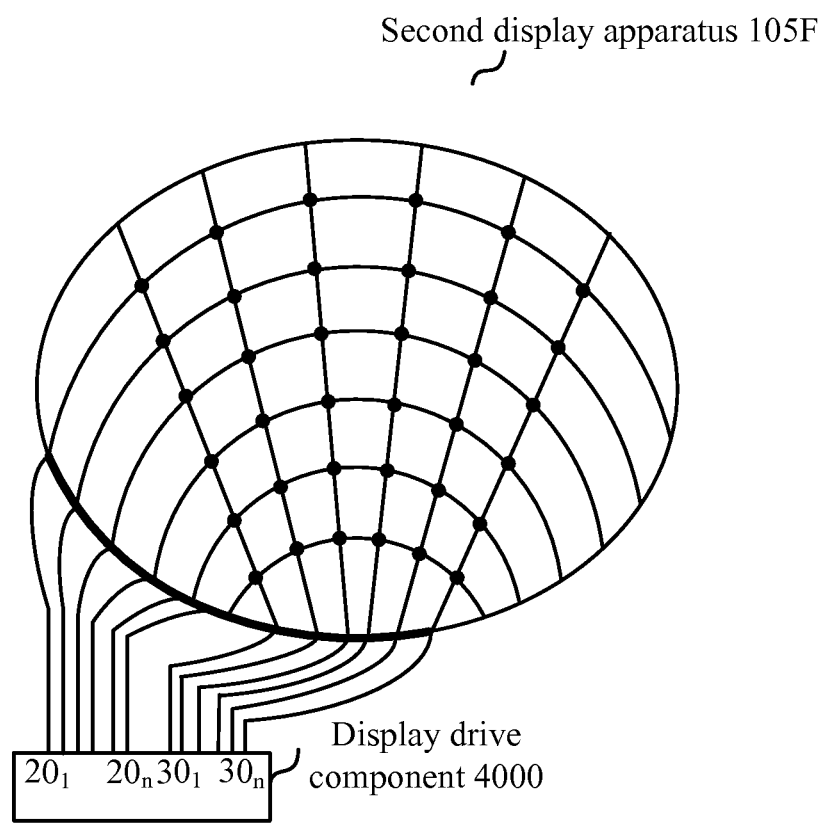
FIG. 18 is a schematic diagram illustrating a fourth example of the second display apparatus according to an embodiment of the present application.

FIG. 18 is a schematic diagram illustrating a fourth example of the second display unit according to an embodiment of the present application. In the second display apparatus 105F according to the embodiment of the present application, at least one type of the plurality of first type of drive lines and the plurality of second type of drive lines includes at least one drive line that is a curve. As shown in FIG. 15, each ($20_1 \ldots 20_n$) of the plurality of first type of drive lines 2000 is a curve, and each ($30_1 \ldots 30_n$) of the plurality of second type of drive lines 3000 is a straight line. As can be readily appreciated, the number of the drive lines and the wiring manner as shown in FIG. 18 are merely illustrative; the second display unit according to an embodiment of the present application is not limited thereto. In another embodiment of the present application, it is allowed that the plurality of second type of drive lines ($30_1 \ldots 30_n$) are a curve, or alternatively, each or more drive lines among the plurality of first type of drive lines ($20_1 \ldots 20_n$) and the plurality of second type of drive lines ($30_1 \ldots 30_n$) are a curve.

As shown in FIG. 18, edge of a visible area of the second display apparatus 105F is divided into two portions, edge of the visible area to which the plurality of first type of drive lines and the plurality of second type of drive lines connected with the display drive component 4000 correspond is located in a first portion of the two portions, that is, the edge portion shown with a bolded line in FIG. 18, whereas edge of the visible area where the plurality of first type of drive lines and the plurality of second type of drive lines connected with the display drive component 4000 are not arranged is the second portion. In the embodiment shown in FIG. 18, the first portion and the second portion have two intersection points, that is, the first portion and the second portion are two separate continuous edge areas, respectively, only intersect at their respective endpoints. As can be readily appreciated, coverage of the present application is not limited thereto, the first portion and the second portion may be divided into a plurality of sub-portions, respectively, the plurality of sub-portions of the first portion and the second portion may be alternately distributed as shown below with reference to FIGS. 15A to 17B. Since the plurality of first type of drive lines ($20_1 \ldots 20_n$) are a curve, so that edge of the first portion may tend to cluster. That is, an edge length of the visible area corresponding to the first portion is less than 50% of a total edge length of the visible area. For example, in the example shown in FIG. 18, an edge length of the visible area corresponding to the first portion where drive lines are provided is ⅓ of a total edge length of the visible area. Thus, the second display apparatus 105F can be provided with a larger edge area that needs no drive line wiring, which thereby facilitates further narrowing the frame of the second display apparatus 105F. That is, in an electronic device where the second display apparatus 105F according to an embodiment of the present application is configured, the second display apparatus 105F may adapt to the shape of the electronic device as needed. Specifically, by adopting the configuration that at least one type of the plurality of first type of drive lines and the plurality of second type of drive lines includes at least one drive line that is a curve, it is possible to bent the drive lines towards the edge of the second display unit that adapts to wiring based on the shape of the electronic device, and select not to configure wiring at the edge having no wiring space of the second display unit based on the shape of the electronic device. Herein, the edge having no wiring space of the second display unit may be an edge where the edge of the second display unit substantially overlaps with the outer frame of the electronic device per se. Alternatively, the edge having no wiring space of the second display unit may be an edge of the electronic device where the outer frame thereof is of an irregular shape and thus is inconvenient for wiring.

In addition, as shown in FIG. 18, curve shape of the drive lines conforms to shape of the edge of the second display unit. In the second display apparatus 105F as shown in FIG. 18, shape of the edge of the second display apparatus 105F is an ellipse. As can be readily appreciated, depending on application requirements, the shape of the edge of the second display unit according to an embodiment of the present invention is not limited to ellipse; instead it may be a variety of regular shapes like circle or irregular shapes. The shape of the drive lines being a curve can implement better conforming to the edge of the second display unit, which is a variety of regular or irregular shapes.

Specifically, the plurality of first type of drive lines ($20_1 \ldots 20_n$) which are curves have the same curvature as the corresponding edge of the second display apparatus 105F. In particular, in the example shown in FIG. 18, the plurality of first type of drive lines ($20_1 \ldots 20_n$) and part of the edge of the second display apparatus 105F form a curve group having the same circle center and radial outward to the outer center layer by layer, wherein part of the edge of the second display apparatus 105F is the outermost edge of the concentric nested curve group. Then the plurality of second type of drive lines ($30_1 \ldots 30_n$) may approximately be a plurality of straight lines radiated radially outward from the circle center. Extension lines of the plurality of second type of drive lines ($30_1 \ldots 30_n$) will intersect at the circle center. Further, the plurality of second type of drive lines ($30_1 \ldots 30_n$) may be divided into two groups symmetrical with respect to a center cross-section of the second display apparatus 105F, for example, drive lines $30_1, 30_2, 30_3$, and drive lines $30_{n-2}, 30_{n-1}, 30_n$.

In addition, as shown in FIG. 18, the plurality of first type of drive lines ($20_1 \ldots 20_n$) are projected as a plurality of curves arranged equidistantly on a plane vertical to a display direction of the array of display cells. In an embodiment of the present application, a surface where the array of display cells resides probably has fluctuation according to the shape of the electronic device to which it is applied. For example, when the second display unit is applied to a dial of a smart watch which is a convex surface, the surface where the array of display cells resides may be a convex surface corresponding to the dial. The direction of the convex outwardly facing the user is the display direction of the array of display cells, the plurality of first type of drive lines ($20_1 \ldots 20_n$) are projected as a plurality of curves arranged equidistantly on a plane vertical to the display direction.

Figure 19:
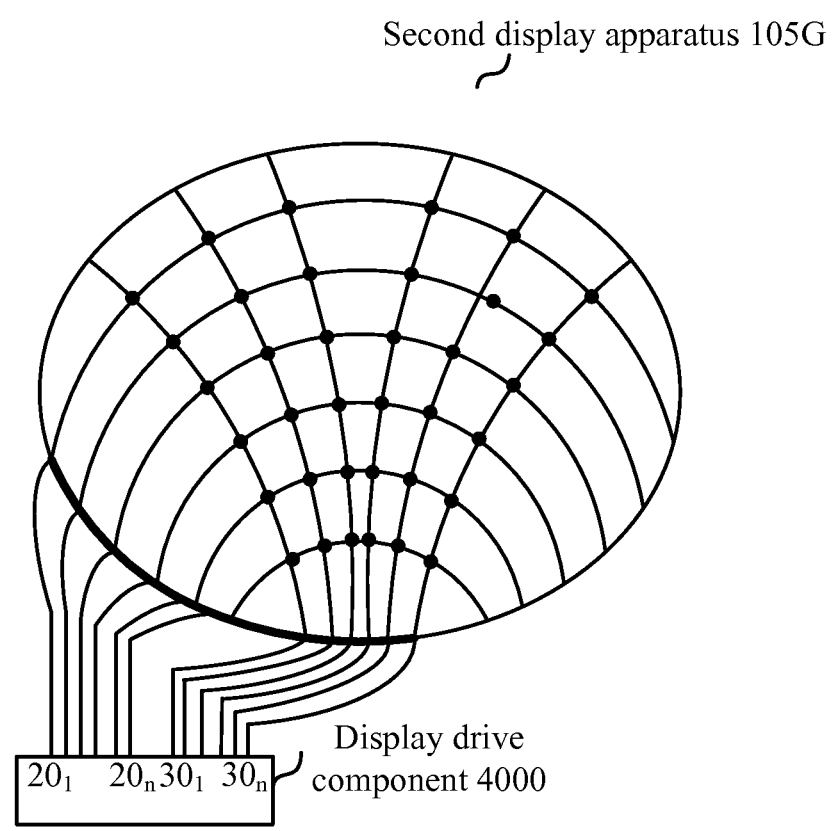
FIG. 19 is a schematic diagram illustrating a fifth example of the second display apparatus according to an embodiment of the present application.

FIG. 19 is a schematic diagram illustrating a fifth example of the second display unit according to an embodiment of the present application. In the second display apparatus 105G according to a second embodiment of the present application, each ($20_1 \ldots 20_n$) of the plurality of first type of drive lines 2000 and each of ($30_1 \ldots 30_n$) the plurality of second type of drive lines 30 is a curve. Specifically, similar to what is shown in FIG. 18, the plurality of first type of drive lines ($20_1 \ldots 30_n$) and part of the edge of the second display apparatus 105G form a curve group having the same circle center and radial outward to the outer center layer by layer, wherein part of the edge of the second display apparatus 105G is the outermost edge of the concentric nested curve group. The plurality of second type of drive lines ($30_1 \ldots 30_n$) are approximately divided into two groups symmetrical with respect to a center cross-section of the second display apparatus 105G, for example, drive lines $30_1, 30_2, 30_3$, and drive lines $30_{n-2}, 30_{n-1}, 30_n$, wherein each group of drive lines ($30_1, 30_2, 30_3$) or ($30_{n-2}, 30_{n-1}, 30_n$) are a portion of a group of inscribed circles that are nested mutually and have a common tangent point.

Accordingly, as compared with the second display apparatus 105F according to the embodiment of the present application as shown in FIG. 18, by configuring all the plurality of first type of drive lines 2000 and the plurality of second type of drive lines 3000 as curves, it is possible to further reduce an edge length of the visible area corresponding to the first portion where the drive lines are provided. For example, in the example shown in FIG. 16, an edge length of the visible area corresponding to the first portion where the drive lines are provided is ¼ of a total edge length of the visible area.

Figure 20:
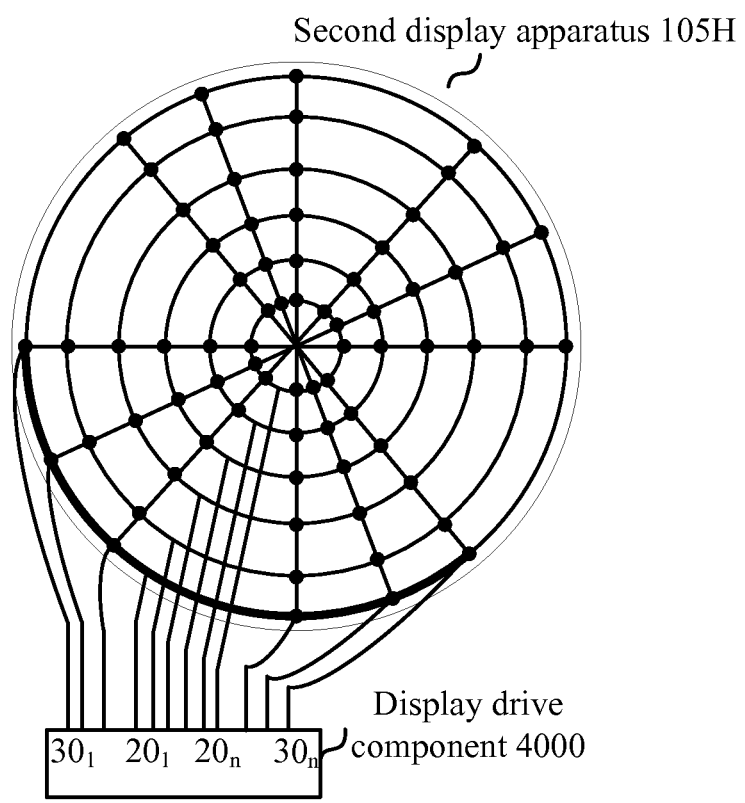
FIG. 20 is a schematic diagram illustrating a sixth example of the second display apparatus according to an embodiment of the present application.

FIG. 20 is a schematic diagram illustrating a sixth example of the second display unit according to an embodiment of the present application. In the second display apparatus 105H according to the embodiment of the present application, each ($20_1 \ldots 20_n$) of the plurality of first type of drive lines 2000 forms a circle, and each of ($30_1 \ldots 30_n$) the plurality of second type of drive lines 3000 is a straight line. Specifically, in the example shown in FIG. 20, the plurality of first type of drive lines ($20_1 \ldots 20_n$) are a group of concentric circles nested concentrically with the edge of the second display apparatus 105H, wherein the edge of the second display apparatus 105H is the outermost edge of the group of concentric circles. Then the plurality of second type of drive lines ($30_1 \ldots 30_n$) may approximately be a plurality of straight lines radiated outward from the common circle center of the concentric circles, the plurality of straight lines are the plurality of straight lines of the outermost circle. Accordingly, as compared with the second display apparatus 105F as shown in FIG. 18 and the second display apparatus 105G as shown in FIG. 19, by configuring all the plurality of first type of drive lines 2000 as circle, it is possible to make the wiring of the drive lines perfectly adapt to the circular outer frame of the display device.

Figure 21:
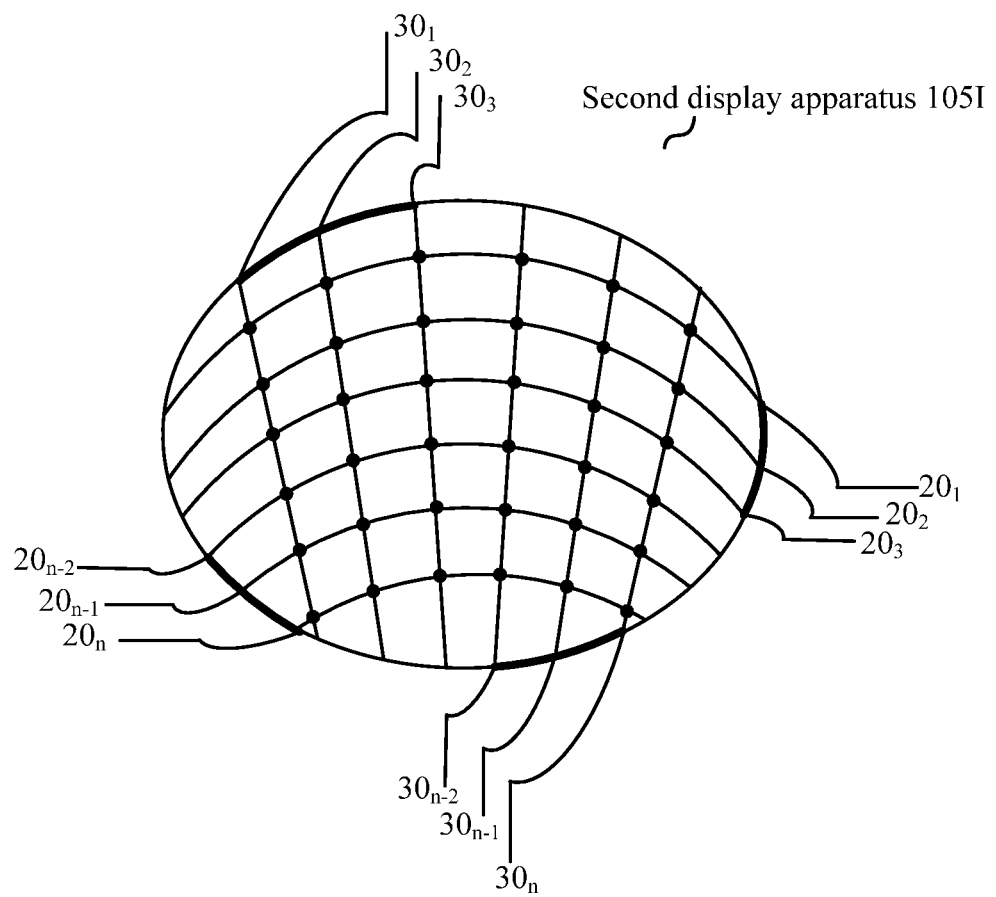
FIG. 21 is a schematic diagram illustrating a seventh example of the second display apparatus according to an embodiment of the present application.

FIG. 21 is a schematic diagram illustrating a seventh example of the second display unit according to an embodiment of the present application. In the second display apparatus 105I according to the embodiment of the present application, at least one drive line in at least one group among a plurality of groups of drive lines into which the plurality of first drive lines and the plurality of second drive lines are divided is a curve. Specifically, as shown in FIG. 21, the drive lines $20_1, 20_2, 30_3, 30_{n-2}, 30_{n-1}, 20_n$ are curves.

In addition, the plurality of first drive lines and the plurality of second drive lines are divided into a plurality of groups of drive lines (four groups as shown in FIG. 21). As can be seen from FIG. 21, adopting such manner of combination of curve configuration and grouping configuration of the drive lines can make the wiring region of the edge of the display device more tend to cluster, facilitate further narrowing the frame of the display device, and meanwhile make the wiring of the drive lines more flexibly adapt to the outer frame of the display device, as compared with the cases of simply adopting the curve configuration (as shown in FIGS. 18 to 21) and those of simply adopting the grouping configuration (as shown in FIGS. 15 to 17B).

Figure 22A:
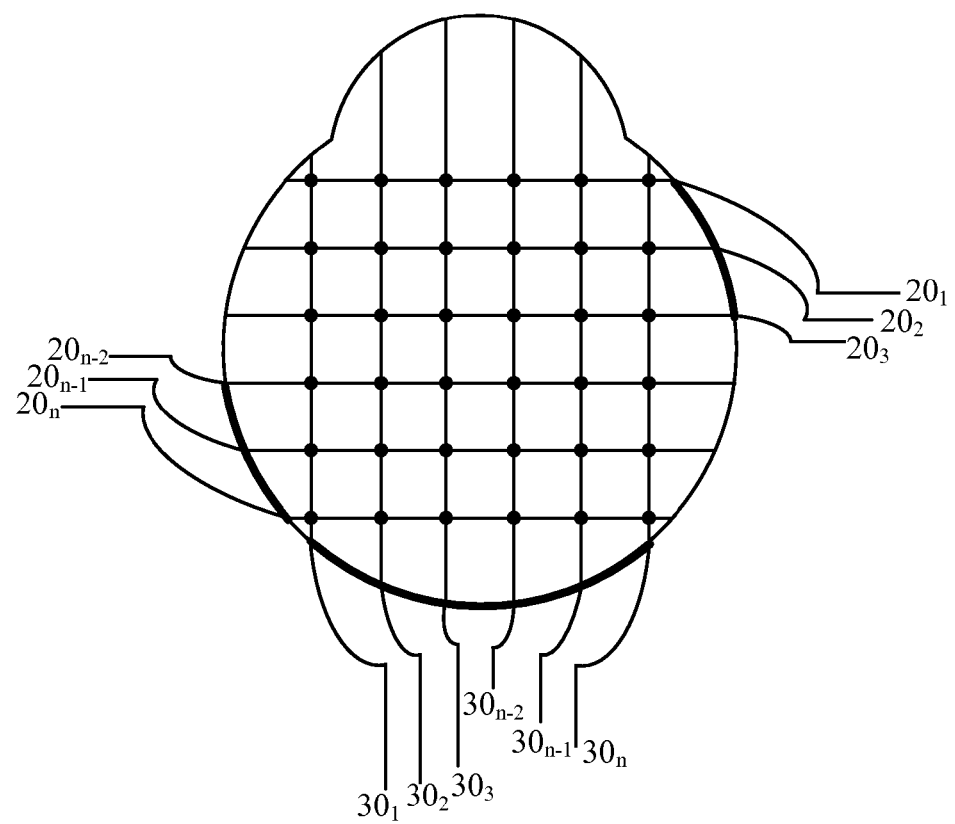
FIGS. 22A to 22B are schematic diagrams illustrating an eighth example of the second display apparatus according to an embodiment of the present application.
Figure 22B:
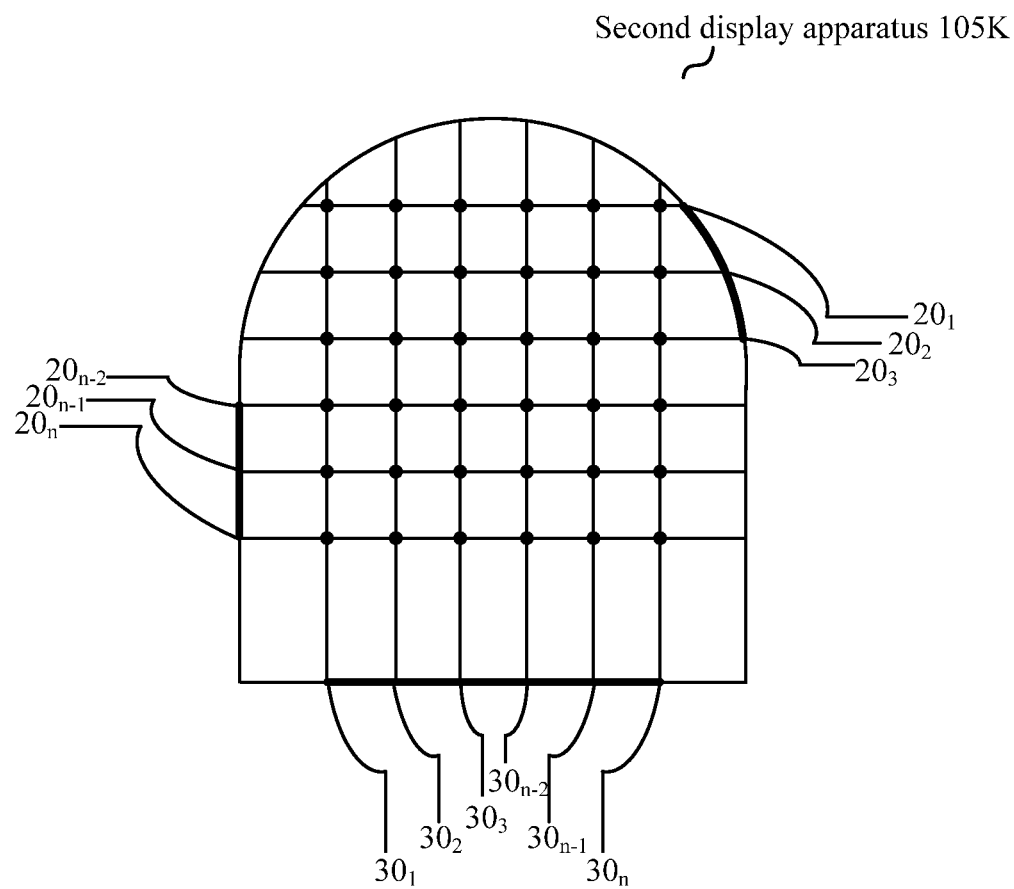

FIGS. 22A to 22B are schematic diagrams illustrating an eighth example of the second display unit according to an embodiment of the present application. In the second display units 105J and 105K according to the eighth embodiment of the present application, at least part of the edge of the surface where the array of display cells 40 residues is a curve, and the edge is at least divided into a first edge portion and a second edge portion, the first edge portion and the second edge portion have different curvatures. Specifically, as shown in FIG. 22A, the edge is divided into an upper first curve edge portion and a lower second curve edge portion; the two portions have different curvatures. Likewise, as shown in FIG. 22B, the edge is divided into an upper first curve edge portion and a lower second straight line edge portion, the two portions obviously have different curvatures. As can be seen from FIGS. 22A and 22B, adopting such wiring manner, the wiring of the plurality of drive lines is not provided in the first edge portion that needs to implement containing the narrow frame of the second display unit correspondingly, the corresponding drive lines, $30_1, 30_2, 30_3, 30_{n-2}, 30_{n-1}, 30_n$ are provided in group in the second edge portion that does not need to implement the narrow frame, so that the wiring can easily adapt to the frame shape according to different requirements. More specifically, for example, when the second display unit as shown in FIGS. 22A and 22B is applied to an electronic device like a smart watch, an edge where the dial of the smart watch is connected with the strap is the second edge portion that does not need to implement the narrow frame, the edge where the dial of the smart watch is not connected with the strap is the first edge portion. In the example shown in FIGS. 22A and 22B, one of the upper edge portion and the lower edge portion is selected as the portion to arrange the wiring group. As can be readily appreciated, the present application is not limited thereto; it is possible to select one of the left edge portion and the right edge portion as the portion to arrange the wiring group.

In the above, an electronic device and the display method according to the embodiments of the present application are described with reference to FIGS. 1 to 22B. The electronic device and the display method according to the embodiments of the present application can improve an overall energy utilization of the display component, and meanwhile can facilitate satisfying the requirement of miniaturizing the display component.

It should be noted that, in the specification, the terms "comprise","include" and any other variations thereof intend to cover nonexclusive inclusion so that the procedure, the method, the product or the equipment including a series of elements include not only these elements, but also other elements which are not listed explicitly, or also include inherent elements of these procedure, method, product or equipment. In the case that there is no further limitation, elements defined by the expressions "comprise one . . . " do not exclude there being additional identity elements in the procedure, method, product or equipment of the elements.

Finally, it should be noted that, the above-described series of processings do not only comprise processings executed chronologically in the order mentioned here, and also comprise processings executed in parallel or individually but not chronologically.

Through the above description of the implementations, a person skilled in the art can clearly understand that the present disclosure may be implemented in a manner of software plus a necessary hardware platform, and of course the present disclosure may also be implemented fully by hardware. Based on such understanding, the technical solution of the present disclosure that contributes to the background art may be embodied in whole or in part in the form of a software product. The computer software product may be stored in a storage medium, such as ROM/RAM, disk, CD-ROM, and include several instructions for causing a computer apparatus (which may be a personal computer, a server, or a network device) to perform the method described in the various embodiments of the present disclosure or certain parts thereof.

Although the present disclosure has been described in detail in the above, specific examples are applied in this text to demonstrate the principles and implementations of the present disclosure, these descriptions of the above embodiments are only to help understand the method of the present disclosure and its core concept. Meanwhile, for a person with ordinary skill in the art, depending on the concepts of the present disclosure, modifications may be made to the specific implementations and applications. To sum up, contents of this specification should not be construed as limiting the present disclosure.

The invention claimed is:

1. A display component comprising:
a light source unit configured to emit source light;
at least two beam splitting units configured to receive the source light and generate at least two reflected lights, wherein directions of the at least two reflected lights match with each other;
a display unit configured to receive the at least two reflected lights and adjust the at least two reflected lights to become initial light by adding information of an image to be displayed into the at least two reflected light,
wherein the initial light is light reflected by the display unit, and the at least two beam splitting units are within an irradiation area of the initial light, and a transmittance in the direction of the initial light exceeds a first threshold, so that the initial light transmits through the at least two beam splitting units,
and an angle between the direction of the initial light and the direction of the source light satisfies a second threshold.

2. The display component of claim 1, wherein a first beam splitting unit of the at least two beam splitting units is provided within an irradiation area of the light source light and splits the light source light into first reflected light and first transmitted light, a second beam splitting unit of the at least two beam splitting units is provided within an irradiation area of the first transmitted light and partially converts the first transmitted light into second reflected light, a direction of the second reflected light matches with a direction of the first reflected light.

3. The display component of claim 2, wherein an intensity difference between the first reflected light and the second reflected light is less than a third threshold, so that a difference between a maximum intensity and a minimum intensity in the initial light is less than a fourth threshold.

4. The display component of claim 3, wherein each of the at least two beam splitting units is cemented by two rectangular prisms, a cemented surface thereof is coated with at least one film layer that determines an intensity proportion of light reflected an transmitted by each of the at least two beam splitting units.

5. The display component of claim 1, wherein a thickness of the at least two beam splitting units in an exit direction of the initial light is less than a width of the display unit in an incident direction of the source light.

6. The display component of claim 1, wherein the at least two beam splitting units further comprise a third beam splitting unit provided within an irradiation area of the second transmitted light, and configured to at least partially convert the second transmitted light to third reflected light when the second beam splitting unit splits the first transmitted light into the second reflected light and the second transmitted light, a direction of the third reflected light matches with a direction of the first reflected light, the display unit is located within an irradiation area of the third reflected light.

7. The display component of claim 2, wherein the at least two beam splitting units are two polarization beam splitting units, and the first reflected light and the second reflected light are polarized light having an identical first polarized state.

8. The display component of claim 7, further comprising a polarization converting unit provided, after a predetermined beam splitting unit of the at least two beam splitting unit completely reflects the polarized light in the first polarized state, within an irradiation area of polarized light transmitting through the predetermined beam splitting unit and in a second polarized state, and configured to convert the polarized light in the second polarized state to the polarized light in the first polarized state.

9. The display component of claim 2, wherein the least two beam splitting units are N beam splitting units, N is an even number larger than or equal to 2, the first reflected light to the N-th reflected light is polarized light having an identical first polarized state, an intensity difference between the first reflected light to the N-th reflected light is less than a third threshold, so that a difference between a maximum intensity and a minimum intensity in the initial light is less than a fourth threshold.

10. The display component of claim 9, wherein each of the N beam splitting units is cemented by two rectangular prisms, a cemented surface thereof is coated with at least one film layer that determines an intensity proportion of light reflected an transmitted by each of the N beam splitting units, so that intensity of light reflected by each of the N beam splitting units is I/N of the intensity of the source light; and the display component further comprises a polarization converting unit, provided within an irradiation area of polarized light transmitting through N/2-th beam splitting unit and in a second polarized state, and configured to convert the polarized light in the second polarized state to the polarized light in the first polarized state.

11. A display component comprising:
a light source unit configured to emit source light;
a first polarization unit configured to at least partially convert the source light into first reflected light, which is polarized light in a first polarized state;
a display unit configured to receive the first reflected light and adjust the first reflected light to become initial light by adding information of an image to be displayed into the first reflected light,
wherein a thickness of the first polarization unit in an exit direction of the initial light is less than a width of the display unit in an incident direction of the source light and the first polarization unit is a polarization beam splitting unit, the first polarization beam splitting unit splits the source light into first reflected light and second transmitted light, the display component further comprises:
a second polarization beam splitting unit provided within an irradiation area of the first transmitted light that transmits through the first polarization beam splitting unit, and configured to at least partially convert the first transmitted light into second reflected light, a direction of the second reflected light matches with a direction of the first reflected light,
the display unit is provided within an irradiation area of the first reflected light and the second reflected light, and causes the first reflected light and the second reflected light to become initial light corresponding to the image under irradiation of the first reflected light and the second reflected light.

12. The display component of claim 11, wherein the initial light is light reflected by the display unit, and the first polarization unit is within an irradiation area of the initial light, and a transmittance in the direction of the initial light exceeds a first threshold, so that the initial light transmits through the first polarization unit,
and an angle between the direction of the initial light and the direction of the source light satisfies a second threshold.

13. An electronic device comprising:
a processing component configured to generate a first image to be displayed and execute display control;
a display component configured to execute display of the first image and including:
a light source unit configured to emit source light;
at least two beam splitting units configured to receive the source light and generate at least two reflected lights, wherein directions of the at least two reflected lights match with each other;
a display unit configured to receive the at least two reflected lights and adjust the at least two reflected lights to become initial light by adding information of an image to be displayed into the at least two reflected light,
wherein the initial light is light reflected by the display unit, and the at least two beam splitting units are within an irradiation area of the initial light, and a transmittance in the direction of the initial light exceeds a first threshold, so that the initial light transmits through the at least two beam splitting units,
and an angle between the direction of the initial light and the direction of the source light satisfies a second threshold.

14. The electronic device of claim 13, wherein a first beam splitting unit of the at least two beam splitting units is provided within an irradiation area of the light source light and splits the light source light into first reflected light and first transmitted light, a second beam splitting unit of the at least two beam splitting units is provided within an irradiation area of the first transmitted light and partially converts the first transmitted light into second reflected light, a direction of the second reflected light matches with a direction of the first reflected light.

15. The electronic device of claim 13, further comprising a first display apparatus in which the display component is provided and which includes a light path converting component configured to receive and perform light path conversion on the light corresponding to the first image and coming from the first display component to thereby form a virtual image corresponding to the first image, so that a viewer at a particular position perceives the virtual image corresponding to the first image, wherein a size of the virtual image perceived is greater than a display size of the display component.

16. The electronic device of claim 15, further comprising:
a body apparatus;
a fixing apparatus connected with the body apparatus and configured to fix a position relationship relative to a user of the electronic device,
wherein the processing component is provided in the body apparatus, the first display component is provided in the body apparatus and/or the fixing apparatus, and
the fixing apparatus includes at least a fixed state in which the fixing apparatus serves as at least a portion of an annular space or an approximate annular space that satisfies a first predetermined condition, the annular space or the approximate annular space surrounds periphery of a columnar body that satisfies a second predetermined condition.

17. The electronic device of claim 16, further comprising a second display unit provided on the body apparatus and/or the fixing apparatus and configured to output a second image, wherein the first display unit and the second display unit are display units that follow different display principles, and
the first display unit has a first visible area, light corresponding to the first image exits from the first visible area, the second display unit has a second visible area, light corresponding to the second image exits from the second visible area, and shape of the first visible area and shape of the second visible area are different.

18. The electronic device of claim 15, wherein the light path converting component comprises a collimating unit and a wave guide unit, the collimating unit is configured to collimate the initial light corresponding to the first image and coming from the display component into collimated light corresponding to the first image and guide the same into the wave guide unit, the waveguide unit is configured to guide the collimated light corresponding to the first image and coming from the collimating unit to the particular position.

* * * * *